United States Patent [19]
Hoglund et al.

[11] Patent Number: 5,628,199
[45] Date of Patent: *May 13, 1997

[54] MICROPROCESSOR-BASED CONTROLLER

[75] Inventors: Steven R. Hoglund, Edina; Kerry E. Ober, Minnetonka; Philip J. Zumsteg, Shorewood, all of Minn.; James M. Tuten, III, Columbus, Ohio; James R. Harnish, York, Pa.; Jay R. Goetz, Minnetonka, Minn.

[73] Assignee: Gas Research Institute, Chicago, Ill.

[*] Notice: The term of this patent shall not extend beyond the expiration date of Pat. No. 5,438,844.

[21] Appl. No.: 261,806

[22] Filed: Jun. 17, 1994

Related U.S. Application Data

[63] Continuation-in-part of Ser. No. 909,527, Jul. 1, 1992, Pat. No. 5,438,844.

[51] Int. Cl.$^6$ .................................................. F25B 49/00
[52] U.S. Cl. ........................... 62/155; 62/160; 62/127; 62/129; 62/228.4; 62/323.1; 62/180
[58] Field of Search ................................ 62/155, 156, 180, 62/181, 183, 184, 126, 127, 129, 154, 160, 228.4, 228.5, 230, 234, 323.1, 323.4, 324.1, 324.5

[56] References Cited

U.S. PATENT DOCUMENTS

| | | |
|---|---|---|
| 3,946,286 | 3/1976 | Kinnunen et al. . |
| 4,045,971 | 9/1977 | Brenner, Jr. . |
| 4,109,481 | 8/1978 | Peek . |
| 4,156,350 | 5/1979 | Elliott et al. . |
| 4,221,962 | 9/1980 | Black et al. . |
| 4,228,846 | 10/1980 | Smorol . |
| 4,251,988 | 2/1981 | Allard et al. . |
| 4,266,599 | 5/1981 | Saunders et al. . |
| 4,269,261 | 5/1981 | Kountz et al. .............. 62/160 |
| 4,334,576 | 6/1982 | Fuchek . |
| 4,384,461 | 5/1983 | Kurtz . |
| 4,407,138 | 10/1983 | Mueller . |
| 4,563,877 | 1/1986 | Harnish . |
| 4,590,771 | 5/1986 | Shaffer et al. . |
| 4,608,832 | 9/1986 | Sabin et al. . |
| 4,680,940 | 7/1987 | Vaughn . |
| 4,689,965 | 9/1987 | Janke et al. . |
| 4,694,657 | 9/1987 | Vaughn . |
| 4,706,882 | 11/1987 | Barnard . |
| 4,735,055 | 4/1988 | Taylor et al. .............. 62/228.4 |
| 4,751,825 | 6/1988 | Voorhis et al. . |
| 4,828,016 | 5/1989 | Brown et al. . |
| 4,850,204 | 7/1989 | Bos et al. . |
| 4,852,360 | 8/1989 | Harshbarger, Jr. et al. . |
| 4,860,551 | 8/1989 | Query . |

(List continued on next page.)

OTHER PUBLICATIONS

Advertisement Brochure Entitled "Comfortable, Cost Efficient Climate Control", Aisin Gas Heat Pumps, Aisin Seiki Co., Ltd., Ann Arbor, MI 48105.

*Primary Examiner*—Harry B. Tanner
*Attorney, Agent, or Firm*—Speckman, Pauley & Fejer

[57] ABSTRACT

A controller for a heat pump system wherein the controller has a variable capacity control capability that responds to thermostat output signals. The variable capacity controller computes real-time performance parameters at variable capacity heating/cooling load conditions of the heat pump system. A defrost controller calculates an optimum heat pump operating time period between successive defrost cycles during a heating mode of the heat pump. Such values are calculated as a function of sensed time, temperature and variable capacity operating conditions which are calculated by the variable capacity controller. The controller preferably has a manual mode for verifying correct operation of each actuator of the heat pump system, as a function of a sequenced input signal, while the heat pump system is in a shutdown mode. The manual mode control also computes and generates an output signal for controlling each actuator to achieve efficient operation control of the heat pump system in various operational states, based upon predetermined operating parameters.

27 Claims, 36 Drawing Sheets

U.S. PATENT DOCUMENTS

| | | | |
|---|---|---|---|
| 4,882,908 | 11/1989 | White. | |
| 4,916,912 | 4/1990 | Levine et al.. | |
| 4,939,910 | 7/1990 | Umezu et al. | 62/160 |
| 5,074,120 | 12/1991 | Kitamoto | 62/156 |
| 5,099,651 | 3/1992 | Fischer | 62/160 |
| 5,115,967 | 5/1992 | Wedekind. | |
| 5,168,713 | 12/1992 | Howland | 62/160 |
| 5,438,844 | 8/1995 | Hoglund et al. | 62/160 X |

| SOURCE | GHPC SIGNAL | INPUT/OUTPUT | SIGNAL WAVEFORM |
|---|---|---|---|
| THERMOSTAT | STAGE 1 (Y1) | INPUT | OFF/ON |
| | STAGE 2 (Y2) | INPUT | PWM (1-sec PULSE CELL WIDTH) |
| | STAGE 3 (W) | INPUT | OFF/ON |
| | HEAT/COOL (O) | INPUT | OFF/ON |
| | FAN (G) | INPUT | OFF/ON (e.g., AUTO, ON) |
| | CHECKLIGHT (X) | OUTPUT | OFF/ON |

FIG.28

| SOURCE | GHPC SIGNAL | INPUT/OUTPUT | SIGNAL WAVEFORM |
|---|---|---|---|
| INDOOR BLOWER ECM | ON/OFF | OUTPUT | OFF/ON |
| | HIGH SPEED | OUTPUT | OFF/ON |
| | BLOWER SPEED | OUTPUT | PWM (7- TO 17-ms PULSE CELL WIDTH) |

FIG.29

| SOURCE | GHPC SIGNAL | INPUT/OUTPUT | SIGNAL WAVEFORM |
|---|---|---|---|
| ECS | ENGINE ON | OUTPUT | OFF/ON |
| | RECEIVE | INPUT | OFF/ON (DIGITAL SERIAL) |
| | TRANSMIT | OUTPUT | OFF/ON (DIGITAL SERIAL) |
| | COMMON | N/A | SIGNAL COMMON |
| | ECS | OUTPUT | OFF/ON |
| | ECS MULTIPLEX | OUTPUT | OFF/ON |

FIG.30

| SOURCE | GHPC SIGNAL | INPUT/OUTPUT | SIGNAL WAVEFORM |
|---|---|---|---|
| SERVICE ANALYZER | SA STAGE 1 | INPUT | OFF/ON |
| | SA HEAT/COOL | INPUT | OFF/ON (e.g., HEAT, COOL) |
| | RECEIVE | INPUT | OFF/ON (DIGITAL SERIAL) |
| | TRANSMIT | OUTPUT | OFF/ON (DIGITAL SERIAL) |
| | COMMON | N/A | SIGNAL COMMON |
| | SA MULTIPLEX | OUTPUT | OFF/ON |

FIG.31

| SIGNAL NAME | GHPC STATE | SOURCE/INPUT(S) | PROCESSING | OUTPUT |
|---|---|---|---|---|
| INPUTS | | | | |
| STAGE 1 (Y1) | 3-12 | THERMOSTAT | POLLED EVERY SECOND | N/A |
| STAGE 2 (Y2) | 3-12 | THERMOSTAT | INTERRUPT ROUTINE | N/A |
| STAGE 3 (W) | 3-12 | THERMOSTAT | POLLED EVERY SECOND | N/A |
| HEAT/COOL (O) | 3-12, 15 | THERMOSTAT | POLLED EVERY SECOND | N/A |
| FAN (G) | 3-12 | THERMOSTAT | POLLED EVERY SECOND | N/A |
| TEMPERATURE SENSORS: ID, OD, LL | 3-12 | THERMISTORS | | |
| 24 VAC POWER MONITOR | 2-15 | GHPC CIRCUIT | POLLED EVERY SECOND | N/A |
| ECS COMMUNICATIONS | 1-15 | ECS, GHPC CIRCUITS | SCHEDULED EVERY SECOND | N/A |
| SA COMMUNICATIONS | 1-15 | SA, GHPC CIRCUITS | SCHEDULED EVERY SECOND | N/A |
| NVM DRIVER | 1-15 | GHPC DETECTS FAULT OR SA DATA REQUEST | EVENT-DRIVEN SCHEDULING | N/A |
| LPCO | 4-9 | EXTERNAL SWITCH | POLLED EVERY SECOND | N/A |
| DEFROST SELECT | 6 | GHPC CONNECTOR | TIME-TO-DEFROST COMPUTES SCHEDULING | N/A |
| BIT ROUTINES | 1-2 | GHPC CIRCUITS, SA CONTROL INTERNAL TEST REQUEST | POWER-ON, EVENT-DRIVEN SCHEDULING | N/A |

FIG.32

| SIGNAL NAME | GHPC STATE | SOURCE/INPUT(S) | SOFTWARE PROCESSING | OUTPUT |
|---|---|---|---|---|
| OUTPUTS | | | | |
| INDOOR BLOWER (OFF/ON) | 3-13 | THERMOSTAT THERMOSTAT INDOOR BLOWER OVERRUN TIMER, INDOOR DISCHARGE TEMPERATURE | INTEGRAL | INDOOR BLOWER ENABLE(FE) |
| INDOOR BLOWER SPEED | 3-13 | THERMOSTAT (Y2), THERMOSTAT (0), ECS (ACTUAL RPM) | PROPORTIONAL | INDOOR BLOWER SPEED(F) |
| OUTDOOR FAN (OFF/ON) | 5-13 | GHPC STATE | INTEGRAL | OUTDOOR FAN ENABLE (FO) |
| OUTDOOR FAN SPEED | 5-13 | THERMOSTAT (0), OUTDOOR TEMPERATURE | PROPORTIONAL | OUTDOOR FAN SPEED (FS) |
| REVERSING VALVE | 3-14 | THERMOSTAT (0), GHPC STATE | INTEGRAL | REVERSING VALVE(RV) |
| AUXILIARY HEATER | 6,8,9 | THERMOSTAT (W), GHPC STATE | INTEGRAL | AUXILIARY HEATER(AH) |
| THERMOSTAT CHECKLIGHT | 2-15 | GHPC FAULT | INTEGRAL | THERMOSTAT CHECKLIGHT (X) |

FIG.32(Cont.)

MICROPROCESSOR-BASED CONTROLLER

CROSS REFERENCE TO RELATED APPLICATION

This is a continuation-in-part patent application to the earlier filed and patent application having U.S. Ser. No. 07/909,527, and filed Jul. 1, 1992, U.S. Pat. No. 4,438,844.

BACKGROUND OF THE INVENTION

This invention relates to a microprocessor-based, controller with embedded software, which provides automatic system control of an advanced multi-stage, variable-capacity heat pump system. The controller of this invention provides diagnostic, service and information functions for both heat pumps with compressors driven by electric motors and engines.

SUMMARY OF THE INVENTION

It is one object of this invention to provide a controller with real-time control, diagnostic, service and information functions, preferably for controlling a heat pump.

It is another object of this invention to provide a controller that sequences hardware, such as valves, fans and auxiliary healers, for energy-efficient and cost-efficient control of equipment, particularly air and ground source heat pump The above and other objects of this invention are accomplished that controller that provides automatic system control of advanced multi-stage, variable-capacity heat pump systems. The controller of this invention enables user comfort energy savings and reliable system operation, while also providing diagnostic, service and information functions which are particularly suitable for a heat pump.

According to one preferred embodiment of invention, the controller provides time sequencing of valves, fans and auxiliary heat, of a heat pump system. The controller also provides supervisory controller of the engine or electric compressor motor for ON, OFF, and speed command. The controller is capable of sensing operating air and fluid temperatures of the heat pump system, as well as the status of communicating safety switches. According to one preferred embodiment of this invention, the controller includes a "smart" defrost control as a function of time, one or more temperatures and other variable parameters. The "smart" defrost control may also include a configurable time-to-defrost setting. The controller may also include communications with the electric motor or gas engine compressor drive control and a service analyzer.

According to various preferred embodiments of this invention, the diagnostic functions of the controller may include: a self-test, with LED indication; identification of fault conditions; control action response to fault conditions; indication of faults and required service; and logging of fault and other related system status parameters. The diagnostic features may include: fault codes for use by service personnel; service priorities for use by the operator of the controller, such as a homeowner; and logged data for access by the service analyzer.

According to other various embodiments of this invention, the information functions of the controller may include: historical data for the system and/or compressor drive; fault history; operating status of the system, compressor drive, sensors and actuators; and information found in nonvolatile memory (NVM). The information features of the controller may include access to information by way of the service analyzer and/or manufacturer service. The controller is preferably powered from an indoor unit transformer and thus battery backup is not an absolute requirement, since erasable, programmable read-only memory (EPROM) and NVM respectively maintain the program and the information in the absence of power to the controller.

Secondary, or other controllers and interface devices that interface with the controller of this invention preferably include a room thermostat, an indoor blower motor speed control, auxiliary heater control, an engine control system (ECS) or a compressor drive control system and a service analyzer (SA). Thermostat logic is communicated between a room thermostat, an indoor blower speed control, auxiliary heater control, and the heat pump controller. The heat pump controller emits controlling signals to the indoor blower speed control. The heat pump controller also emits control signals to the compressor drive control and receives status information and data from the compressor drive control. The SA receives status signals from the heat pump controller and emits command signals back to the heat pump controller. The heat pump controller communicates with components of the heat pump for overall system control.

BRIEF DESCRIPTION OF THE DRAWINGS

The drawings show and describe a gas engine heat pump. For an electric heat pump that may be used in lieu of a gas engine heat pump, according to another preferred embodiment of this invention, similar controls are used to operate the variable speed electric compressor motor and heat pump system components and components of the gas engine heat pump which are not required with an electric heat pump, for example, the coolant valve, the coolant pump, the gas engine, engine sensors, ignition components, cranking controls and engine controls. The technical and other aspects of this invention will become more apparent when the specification is read in view of the drawings, wherein:

FIG. 28 shows a table summarizing GHPC signal, Input/Output and Signal Waveform for a Thermostat interface, according to this invention;

FIG. 29 shows a table summarizing GHPC signal, Input/Output and Signal Waveform for an Indoor Blower ECM, according to this invention;

FIG. 30 shows a table summarizing GHPC signal, Input/Output and Signal Waveform for an ECS, according to this invention;

FIG. 31 shows a table summarizing GHPC signal, Input/Output and Signal Waveform for a Service Analyzer, according to this invention; and FIG. 32 shows a table relating specific signals to GHPC States, Source/Input(s), Processing, and Output, according to this invention.

DESCRIPTION OF PREFERRED EMBODIMENTS

According to one preferred embodiment of this invention, the controller is a microprocessor-based controller which is preferably used to control the operation of a heat pump driven by a gas engine or an electric motor, particularly suitable for those installed in residential buildings. As discussed throughout this specification, it is apparent that the heat pump can be driven by either a gas engine or an electric motor. The controller provides functions such as engine supervisory control with or without direct engine control, heat pump control, defrost and supplemental heat control, system fault detection, system fault lock-out and reset, system information and fault diagnostic display, data communications and on-board and field service testing and manual mode functions.

Figure 1:
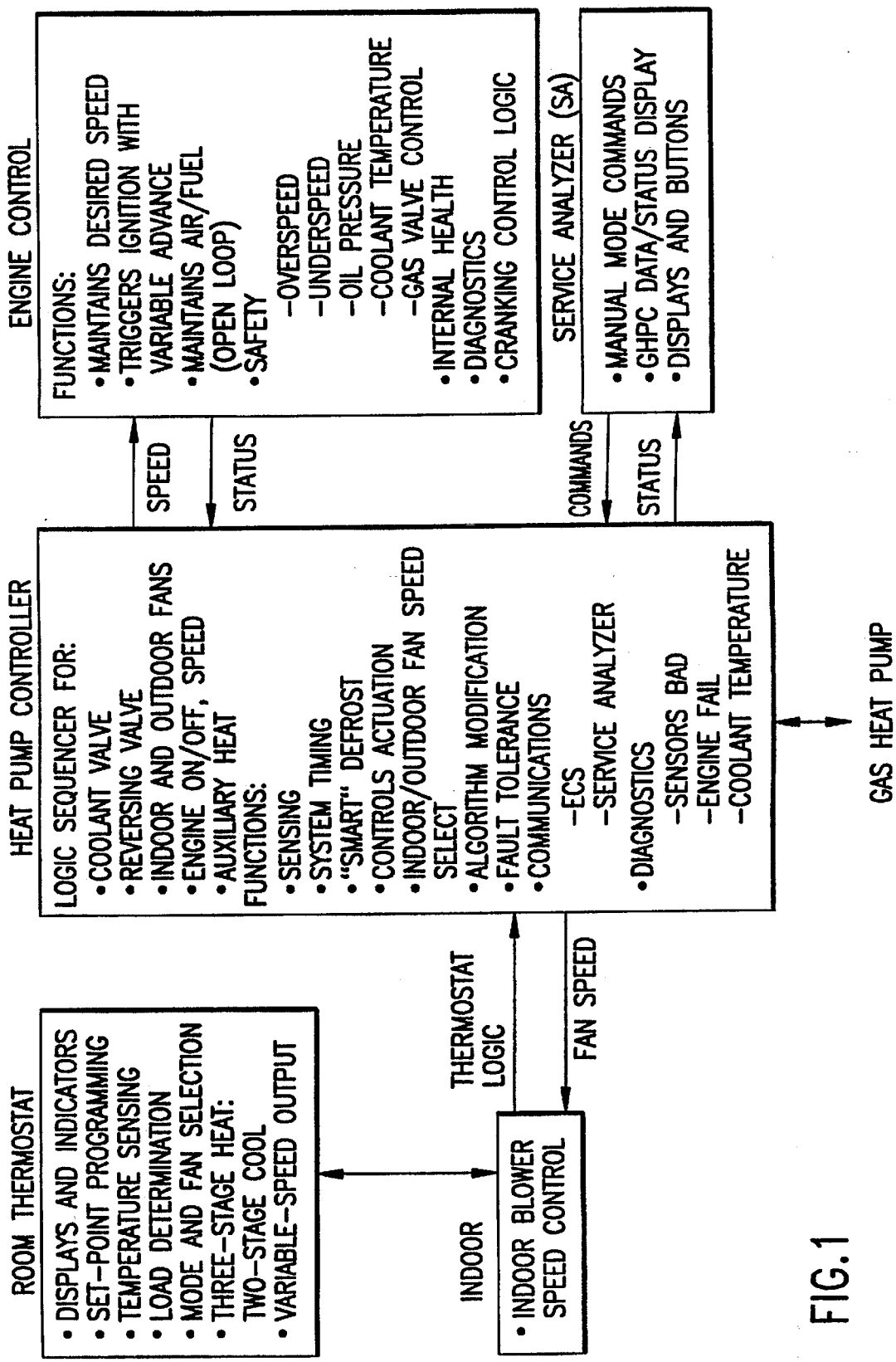
FIG. 1 is a distribution of functions showing the relationship between various components and functions of a heat pump system, according to one preferred embodiment of this invention.

FIG. 1 is a distribution of functions showing the relationship between various components and functions of a heat pump system of this invention. According to one preferred embodiment of this invention, the controller is constructed as a non-safety, Class 2, low-voltage control that is mounted at the heat pump. As discussed throughout this specification, the controller is described with respect to a heat pump; however, it is apparent that the controller of this invention can be used to control heat pumps driven with other equipment, such as any other suitable device that provides control of the speed of the compressor, in a fashion similar to the control of the gas-engine driven heat pump. This specification primarily focuses upon one preferred embodiment of this invention wherein the controller is used to control a heat pump but it is also apparent that the controller of this invention may be used to control other equipment, such as an electric heat pump.

According to one preferred embodiment of this invention, the heat pump system has a variable speed compressor. A controller having a microprocessor is used to control the heat pump system. The controller comprises variable capacity control means which respond to one or more thermostat output signals and one or more sensor input signals from various components and positions throughout the heat pump system. Based upon at least one thermostat output signal, the variable capacity control means computes in real-time performance parameters at variable capacity heating/cooling load requirements of the heat pump system. Such performance parameters may include output signals corresponding to the computation of applicable control algorithms, software variable values, and the like.

In one preferred embodiment according to this invention, the variable capacity control means respond to each thermostat output signal based upon various sensor input signals. Such sensor input signals may correspond, for example, to an outdoor air temperature, a liquid line temperature, and an indoor air discharge temperature.

The controller also preferably comprises defrost control means for calculating an optimum heat pump operating time period between successive defrost cycles during a heating mode of the heat pump, as a function of sensed time, sensed time to defrost select input, temperature and variable capacity operating conditions which are calculated by the variable capacity control means. In one preferred embodiment according to this invention, the defrost control means integrate sensed compressor speed, outdoor air temperature and delivered heating capacity of the heat pump system, over time to determine the optimum heat pump operating time period.

The phrase "optimum heat pump operating time period between successive defrost cycles" throughout this specification and in the claims refers to the time period between defrost operations of the heat pump system that will result in the most efficient system operation. According to one preferred embodiment of this invention, an algorithm is used to optimize the heat pump operating time period between successive defrost cycles to achieve overall optimum efficiency of the heat pump system by initiating the defrost cycle. The heat pump system operates less efficiently as frost builds up on the outdoor coil surface, but each defrost cycle requires energy to melt the frost. Therefore, there is an optimum amount of frost build-up where the combination of the frost degradation penalty and the defrost energy used is the least amount. On warmer days, frost builds up more rapidly with each hour of compressor operation than on colder days. When the compressor is operating at reduced speed, there is less frost accumulation when compared with full speed. An algorithm can be developed to determine the optimum time for best system efficiency for each combination of outdoor temperature and compressor speed.

The controller of this invention includes a microprocessor which is programmed with one or more algorithms which calculate the times necessary for a defrost operation, while in the heating mode of the heat pump system, to achieve maximum system efficiency. The algorithms use one or more of the following variables; sensed time, temperature, time to defrost select input, and variable capacity operating conditions, wherein the temperature preferably corresponds to a liquid line or outdoor coil temperature and/or an outdoor air temperature of the heat pump system.

The preferred algorithm integrates a function of outdoor air temperature, engine speed and defrost select input at regular intervals while the engine is running until a preset threshold value is reached. The time to defrost select input allows for shifting the control curve along the time axis to suit the climate or other pertinent operating condition. If the liquid line temperature is below a predetermined threshold at the regular interval when the function threshold value is reached to initiate a defrost operation, then the defrost operation may be initiated.

For termination of the defrost cycle when the frost has been melted on the outdoor coil, a refrigerant liquid line temperature sensor responds to a rise in temperature to a predetermined value, such as 75° F. The sensor may be located in the liquid line leaving the outdoor coil or on the outdoor coil surface itself.

The termination temperature is selected to rid the coil of frost on normal weather days when the wind velocity is not high. On windy days, the liquid line or coil temperature may not rise to the predetermined value because the wind velocity carries heat away from the coil. A timed override is provided to terminate the defrost cycle if the defrost time becomes excessive.

In another preferred embodiment according to this invention, the controller also comprises input voltage monitor control means for transforming an alternating current input voltage signal into a corresponding direct current voltage signal. Such input voltage control means also emits a direct current voltage signal to an operational amplifier, such as a gain plus offset amplifier. The input voltage control means preferably comprise an input voltage monitor circuit having a diode for half-wave rectifying the alternating current input voltage signal although other means could be used as would be understood by those of ordinary skill in the art.

According to another preferred embodiment of this invention, the controller further comprises computing means, such as a microprocessor, for determining a current operational state of the heat pump system. Based upon current sensed values of the current operational state, the computing means calculate necessary conditions for a successive operational state as a function of at least one of a sensor input value, a control output value and an internal software variable value for transitioning the heat pump system from the current operational state to the successive operational state. In one preferred embodiment of this invention, the computing means comprise at least one programmed algorithm that determines a controlled sequence of the output signals. Such controlled sequence results in maximizing an overall operating efficiency of the heat pump system. A "desired" operating efficiency preferably represents a maximum efficiency of the heat pump system. The necessary conditions for the successive operational state are calculated by the computing means as a function of at least one of a sensor input value, a control output value and an internal software variable value.

In still another preferred embodiment according to this invention, the controller further comprises manual mode control means for verifying correct operation of one or more actuators of the heat pump system, as a function of sequenced input signals while the engine is in a standby mode. The manual mode control means compute or calculate and generate an output signal for controlling each actuator, so that efficient operation control of the heat pump system can be achieved, based upon predetermined operating parameters. The manual mode control means preferably operates at a first control level wherein each actuator is individually controlled while the engine is in a standby mode. The manual mode control means also preferably operate at a second control level wherein the manual mode control means generate substitute signals which are otherwise generated by one or more thermostats, during an operating mode of the heat pump system. In such operating mode, an output of the controller of this invention controls an engine on/off output, an engine speed output, an outdoor fan on/off output, an outdoor fan speed output, an auxiliary heat output, a reversing valve output, a coolant valve output, an indoor blower enable output, and an indoor blower speed output, of the heat pump system, depending upon an output voltage value from the output of the controller.

Figure 2:
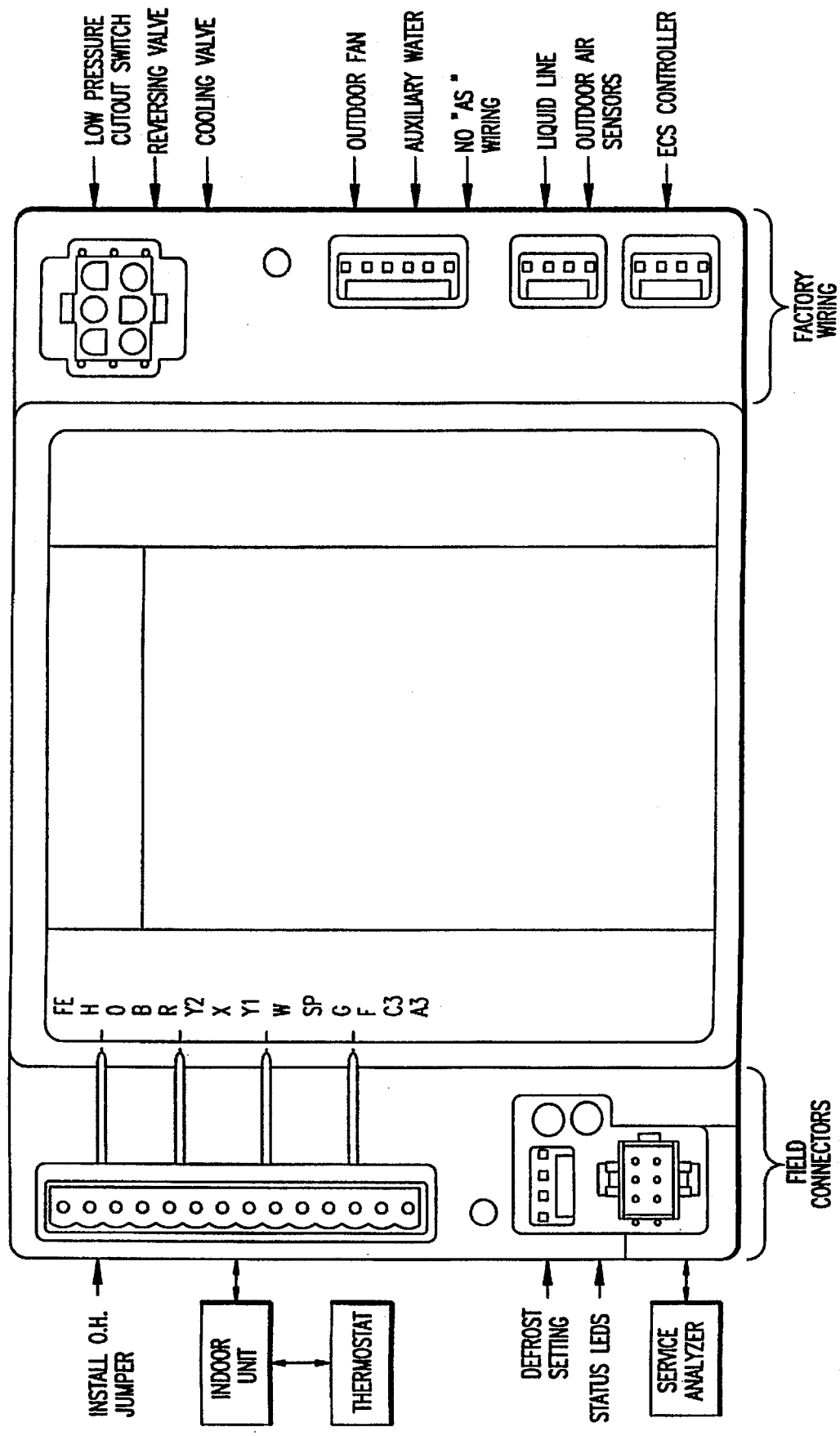
FIG. 2 is a diagrammatic view of a faceplate of a controller, according to one preferred embodiment of this invention.

With its use as a non-safety, Class 2, low-voltage control, the controller of this invention preferably has certain installation restrictions, such as mounting the controller in a protective environment, protecting the controller from immersion in any fluid, and not connecting the controller in the same 24 VAC circuit as the spark ignition control of the heat pump. FIG. 2 shows a preferred faceplate arrangement of a controller, according to one embodiment of this invention.

The controller of this invention will preferably control two different baseline system auxiliary heater types, namely auxiliary heat via a self-contained gas-fired auxiliary boiler or auxiliary heat via domestic hot water.

The controller preferably has two data communications ports, one of which provides a point of connection for a service analyzer, such as a hand-held microprocessor-based user interface device which issues commands to the controller via the serial data communications port. The service analyzer provides a qualified technician with at least three essential capabilities: a display of the heat pump sensor input values and actuator output controls; a first level of manual mode independent control for each actuator; and a second level of manual mode control for the heat pump system with the controller functioning as a replacement for signals normally provided by one or more thermostats.

The first level of commands in the manual mode are used by the technician to verify the correct operation of individual actuators, such as those associated with an outdoor fan, an indoor blower, a reversing valve, a diverting valve, an auxiliary heater, an engine starter, an enrichment valve, a spark ignition, and an engine throttle and other components of the heat pump system. The engine, electrical motor, or other driver that drives the compressor should not be running or should be in a shutdown mode for the first level of command. Each actuator can be independently controlled with the manual mode at the first level. A first level command is issued by the service analyzer microprocessor, for example, to the controller in response to pushbutton inputs from the technician.

In the manual mode, second level commands are issued from the service analyzer to the controller in response to a pushbutton or other input device, for example, sequence by the technician to cause the heat pump algorithms to perform the correct control, as discussed with respect to the variable capacity control, for operation of the heat pump system. At the second level, the service analyzer emits signals in the various controller states which are equivalent to the signals emitted by the thermostat, via a combination of electrical signals and digitally encoded messages. In response to each "pushbutton" sequence, one or more of the actuators can be controlled.

According to one preferred embodiment of this invention, the controller software implements multi-variable control loop algorithms for controlling the actuators and the compressor speed. In one preferred embodiment, the event-driven state machine selects certain control algorithms that the heat pump system should use at a given point in time. The software of this invention accommodates such logic. The event-driven state machine determines the current operating state and the successive operating state, based on current events or current data, including but not limited to sensor input values, control output values, and internal software variable values.

The event-driven state machine remains in the current operational state until the necessary conditions have been met for causing a transition to the successive operational state. When a specific set of criteria is met, the controller initiates the transition from the current operational state to the successive operational state and employs an appropriate set of control algorithms from the controller in order to maintain efficient operation of the heat pump system in such successive operational state. The event-driven state machine is responsible for a specific sequence and performance of the variable capacity heat pump system.

According to one preferred embodiment of this invention, the controller comprises various subcircuits, including: thermostat input #1 (Y2); thermostat input #2 (W, G, AS, O, Y1); coolant valve (CV) output; outdoor fan on/off (FO), outdoor fan speed (FS), auxiliary heat (AH), reversing valve (RV) outputs; indoor blower enable (FE) output; power-up reset; thermostat checklight; watchdog timer; input voltage monitor; nonvolatile memory (NVM); +5 VDC power supply; +16 VDC power supply; communications interface; temperature sensor inputs; indoor blower speed (F); defrost selects; LED drivers; and low-pressure cutout sense. Various similar combinations of some or all of these circuits may be used as would be known to those of ordinary skill in the art.

The corresponding inputs and outputs of the circuits and/or subcircuits according to this invention should be able to withstand a direct short to approximately 24 VAC, which can be as high as approximately 30 VAC, an approximately 3-kV 60-µs lightning spike, up to approximately 15 kV static discharge, and approximately ±350 V transients. The circuits and/or subcircuits according to this invention should also operate reliably from about −40° C. to about +65° C. ambient temperature. It is apparent that the values given for variables as discussed throughout this specification and shown in the drawings, such as temperature, voltage and the like, can vary depending upon the desired application and/or result of each preferred embodiment, as well as the various component materials and component construction.

As used throughout this specification and in the claims, certain terms are intended to have the following definitions:

All AC voltages are RMS values, unless otherwise defined.

All AC currents are RMS values, unless otherwise defined.

SA stands for a service analyzer, such as a heat pump service analyzer which is available from York International, in York, Pa.

ECS stands for engine control system.

GHPC stands for heat pump controller.

Tstat stands for a heat pump thermostat.

PWM stands for pulse-width-modulated signal.

PX.X stands for input/output ports of a microprocessor.

RP stands for "R" protected. All actuator power comes from specific traces in a 24 VAC power circuit.

YP stands for "Y1" protected. Power for an auxiliary heater comes from Y1 line.

VA stands for volt-amperes.

LED stands for light-emitting diode.

MIN-STOP-TIME stands for a time period, such as six minutes.

FC21 stands for an engine fail to start fault, such as reported by the ECS.

STRRPM stands for starting RPM of the engine.

CAT 1 stands for fault category one, such as a lockout fault code.

CAT 2 stands for fault category two, such as a shutdown fault code.

Changeover stands for a certain engine RPM.

Thermostat Input #1 (Y2) Input

Figure 3:
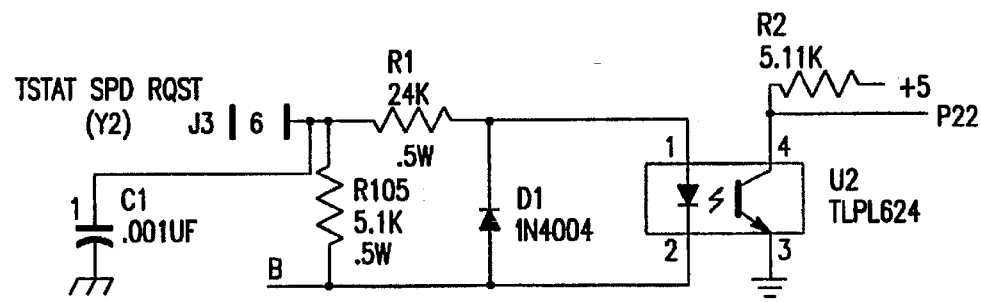
FIG. 3 is a schematic diagram of a thermostat input circuit, according to one preferred embodiment of this invention.
Figure 4A:
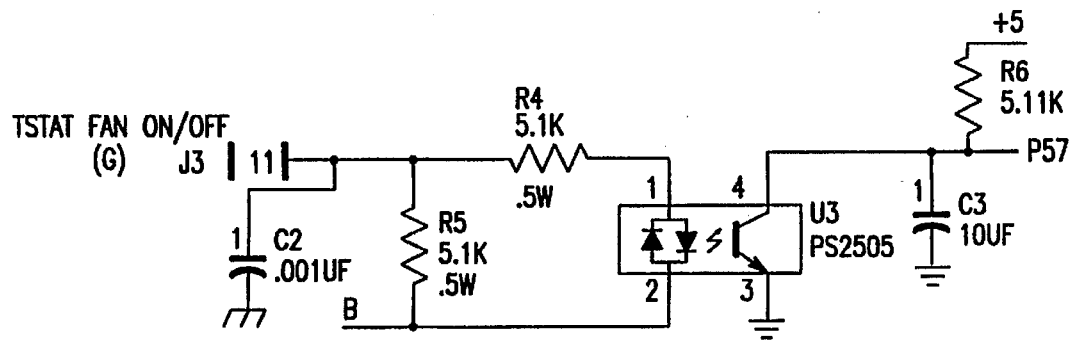
FIGS. 4A–4E are various schematic diagrams for a thermostat input circuit, according to another preferred embodiment of this invention.
Figure 4B:
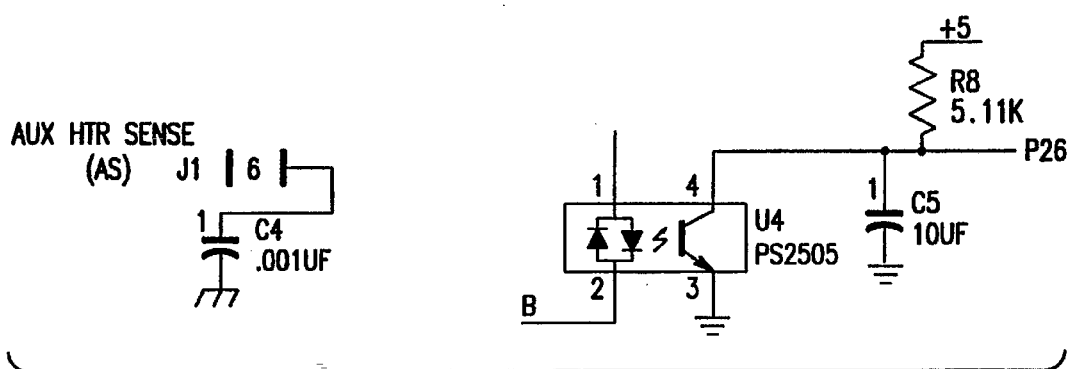
Figure 4C:
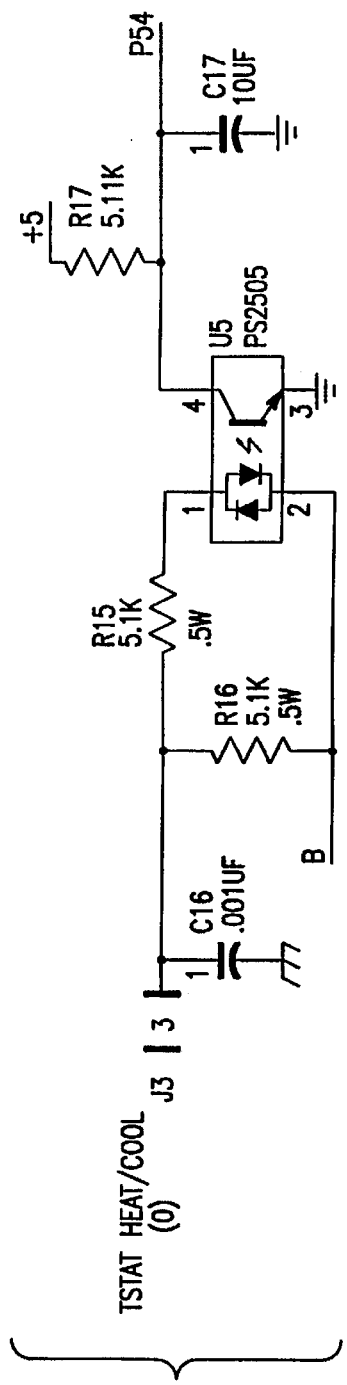
Figure 4D:
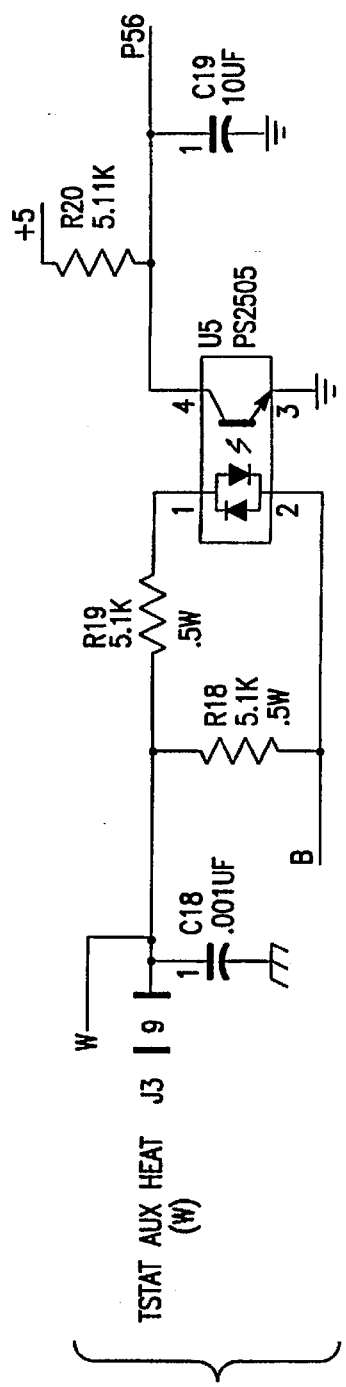
Figure 4E:
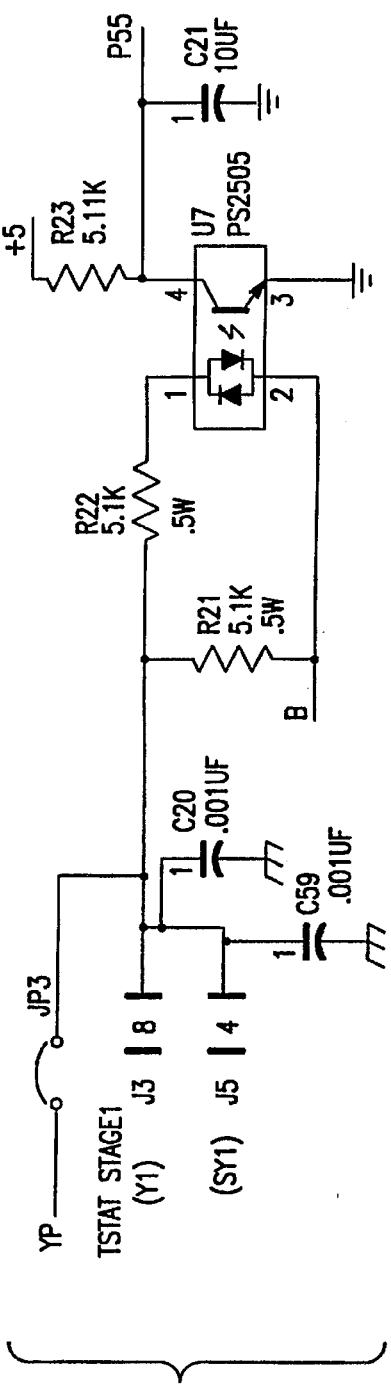

With respect to the circuit description which follows, the output of the circuit shown in FIG. 3, connected to P22 (a discrete input) of the microprocessor, should be relatively high ($\geq 4.2$ VDC) when the input voltage from a preferred thermostat is relatively low ($\leq 1.0$ VDC) and should be relatively low ($\leq 0.8$ VDC) when the input voltage is relatively high ($22.0 \leq$ input $\leq 40.4$ VDC peak value, through a 1.2 k$\Omega$ resistor). According to one preferred embodiment of this invention, the output should be able to switch between states in less than approximately 6 ms.

Such circuit should also function with a standard thermostat Y2 input, which is a 24 VAC relay closure. Such circuit should provide a path for the ~100 µA leakage current from the thermostat relay snubber circuit, and the output should remain off in this particular embodiment. The controller should interpret 24 VAC at the input of the Y2 circuit as a 100% on PWM signal.

The input of such circuit comes from Y2 of the thermostat. This is an unregulated DC PWM signal derived from the 24 VAC supply (R). The value of this voltage is the peak value of R (R * $\sqrt{2}$)−2.0 (two diode drops). This voltage ranges from 22.0 to 40.4 for R between 17 and 30 VAC. The nominal value at R=24 VAC, is 31.9 VDC. This voltage passes through a voltage divider comprising a 1.2 kΩ resistor in the thermostat subbase and the controller resistor R1. With R1 set at 24.0 kΩ, the Y2 input ranges between 20.9 and 38.5 VDC. The PWM speed command is divided into 16 steps of approximately 62.5 ms each. (Speed 1 would be high for 62.5 ms; speed 2 would be high for 125 ms, etc.) The circuit requirement for switching in less than approximately 6 ms is based on a tolerance of ±10% on this signal.

The Y2 signal is fed through the resistor (R1) into a DC optoisolator. The value of R1 is chosen to turn on the LED of the optoisolator hard enough so the output transistor saturates when the input voltage is between 20.9 and 38.5 VDC. The collector of the output transistor is pulled up to +5 VDC with a resistor chosen to set the collector current at ~1 mA. The collector is also tied to an input pin of the microprocessor, which interprets a low voltage as 'ON'. The saturation voltage of the transistor is 0.2 VDC, keeping the micro pin well below the 0.8 VDC $V_{IL}$.

When the Y2 signal is low ($\leq 1.0$ VDC), the LED does not turn on, keeping the output transistor off and pulled up to +5 VDC. The microprocessor interprets this as 'OFF'.

The resistor R105 provides a path for the 100 µA leakage current from a standard thermostat in the OFF state. The output of the circuit in the ON state with a standard thermostat is a pulse at 60 Hz, which the controller interprets as 100% on. The 0.001 µF capacitor and the optoisolator on the input provide protection from static, lightning, and transients, and the input resistors can handle shorts to 24 VAC. The diode on the input of the optoisolator prevents negative voltages from damaging the optoisolator LED.

Thermostat Input #2 (W,G,AS,O,Y1) Inputs

With respect to the circuit description which follows, the outputs of the circuits of FIGS. 4A–4E are connected to P56, P57, P26, P54, and P55 (discrete inputs) of the microprocessor. These outputs should be relatively low ($\leq 0.8$ VDC) when the inputs are relatively high ($15.6 \leq$ input $\leq 28.6$ VAC). Such outputs should be relatively high ($\geq 2.2$ VDC, except P26 which is $\geq 4.2$ VDC) for relatively low input ($\leq 0.25$ VAC) (basically open circuit, but with leakage current ~100 µA).

The circuits of FIGS. 4A–4E should be able to sink this leakage current and remain in the off (high) state.

The inputs of the circuits of FIGS. 4A–4E come from outputs of the thermostat. Each output acts as a relay that either connects the line to 'R' (nominally 24 VAC) or open circuits the relay. Each output can travel up to 100 ft through wire as thin as 19 AWG. At 8.37 Ω/1000 ft and 1.6 A, this leads to a voltage drop of up to 1.4 VAC at the controller. Since the controller operating voltage is preferably between 17.0 and 30 VAC, when a thermostat relay is closed, the corresponding voltage at the controller can range from 15.6 to 28.6 VAC.

Such voltage is applied to the input resistor of the corresponding controller input circuit. The current through the resistor turns on the LEDs in the AC optoisolator, which is shown in FIGS. 4A–4E. The input resistor value is chosen so that the output transistor of the optoisolator will saturate for voltages between 15.6 and 28.6 VAC. The collector of the output transistor is pulled up to +5 VDC through a resistor that sets the collector current. The collector is also tied to an input of the microprocessor, which interprets a low voltage as 'ON'. The output transistor saturation voltage is 0.3 VDC, keeping the microprocessor well below the 0.8 VDC $V_{IL}$. When the thermostat relay is open circuited, a RC snubber network across the relay contacts will create a small (about 100 µA) leakage current. The controller input circuits have a shunt resistor from the input to common to sink this current. The resistor is chosen so that the 100 µA across it does not develop enough voltage to turn on the LEDs of the optoisolator. In this OFF state, the output transistor of the optoisolator is turned off so that the collector is pulled up to +5 VDC. This point is tied to an input of the microprocessor, which interprets the high voltage as 'OFF'.

The AS circuit is not actually a thermostat input circuit, but is tied to the W line through two auxiliary heat safety switches (normally closed), so that under normal operating conditions AS is tied to W. Because the W input circuit has a shunt resistor to sink the approximately 100 µA leakage current, the AS circuit does not need to have a shunt resistor.

The 0.001 µF capacitors and optoisolators on the inputs provide protection from static, lightning, and transients, and the input resistors can handle shorts to 24 VAC.

The AS circuit can be disabled by removing R7 (5.1 kΩ), particularly when there is a concern that miswiring or shorts to 24 VAC could cause the AS circuit to lock on the auxiliary heater, causing a safety problem.

Coolant Valve (CV) Output

Figure 5:
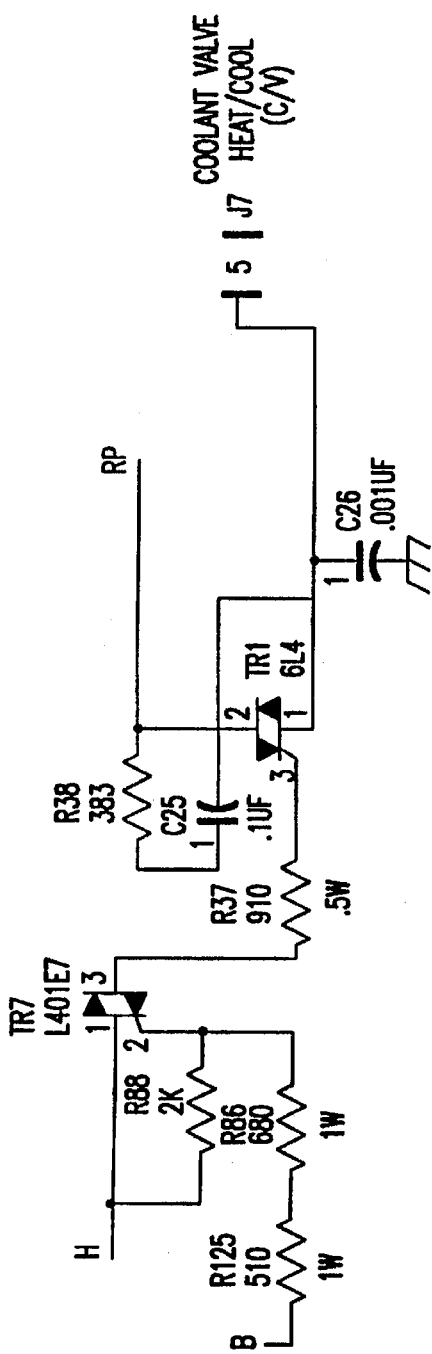
FIG. 5 is a schematic diagram of a circuit which electrically isolates a coolant valve output, according to one preferred embodiment of this invention.
Figure 6A:
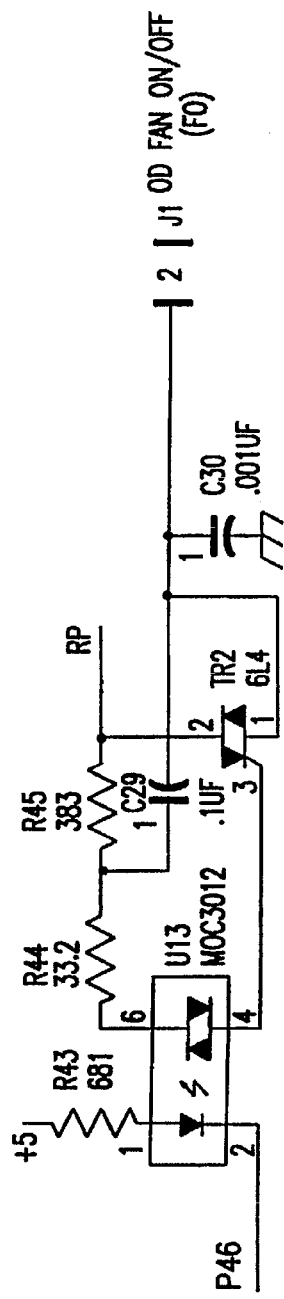
FIGS. 6A–6D are schematic diagrams of output circuits, according to various preferred embodiments of this invention.
Figure 6B:
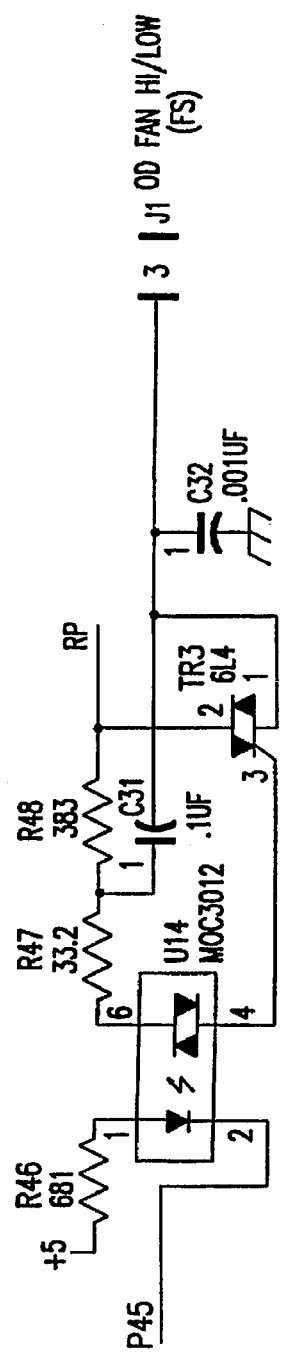
Figure 6C:
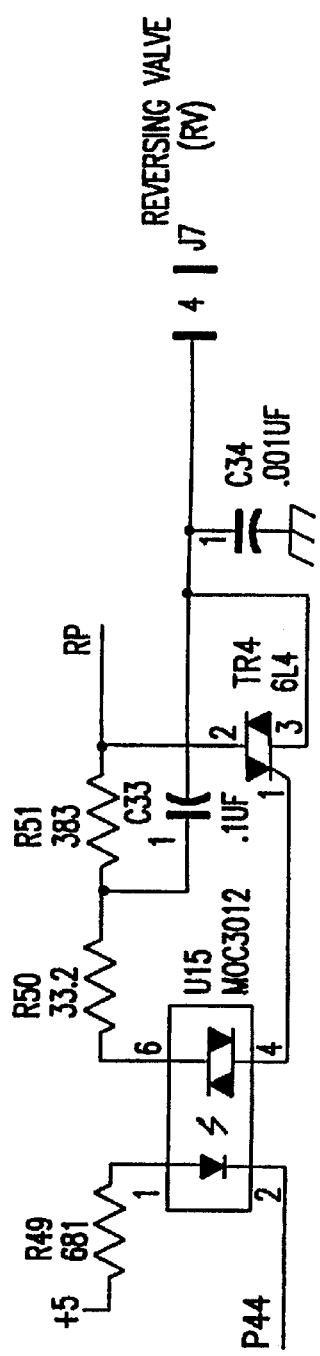
Figure 6D:
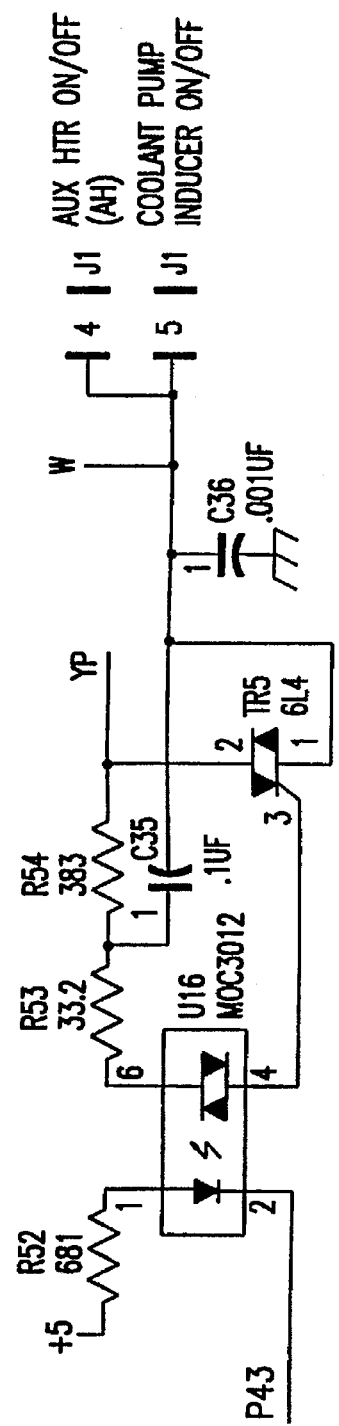

With respect to the circuit description which follows, the CV output shown in FIG. 5 is preferably on (24 VAC and sinking current from RP to CV) when H is relatively high ($15.6 \leq H \leq 28.6$ VAC), and is preferably off (open circuit) when H is relatively low ($\leq 0.25$ VAC). H will normally be connected to the 0 line of the thermostat, so H will be high whenever the thermostat is in a cooling mode. The expected load on the CV output is 7.68 W at 24 VAC.

The CV output is turned on when the H line is on (nominally 24 VAC). The voltage divider caused by the two resistors on triac TR7 turns on the gate and allows current to flow from H into MT1 of the triac. This current passes through the traffic and into the gate of TR1. This gate current turns on TR1 and allows the CV output to sink current from RP.

When the H line is off ($\leq 0.25$ VAC), negligible voltage is applied to the gate of triac TR7 so it stays off in the blocking state. This prevents gate current from going into TR1, keeping TR1 off in the blocking state, keeping the CV output at 0 VAC and sinking no current.

The 0.001 µF capacitor on the output and the relatively high (400 V) breakdown voltage of the triac provides protection from static, lightning, and transients, and shorts to 24 VAC. The RC snubber network across the triac is necessary to prevent commutating dV/dt from the inductive load latching the triac on and causing loss of control of the output.

Fan On/Off (FO), Fan Speed (FS), Auxiliary Heat (AH), Reversing Valve (RV) Outputs With respect to the circuit description which follows, the outputs shown in FIGS. 6A–6D should be off (open circuit) when the controlling outputs of the microprocessor (P46, P45, P43, P44) are high ($\geq 4.2$ VDC). When the microprocessor outputs are relatively low ($\leq 0.45$ VDC), the outputs should be on (24 VAC and sinking current from RP or YP to the loads). The AH output(s) should be disabled when Y1 is off ($\leq 0.25$ VAC). The expected loads on these outputs are, for example: FO–4 VA inrush, 3.5 VA sealed; FS–4 VA inrush, 3.5 VA sealed; AH–40 VA inrush, 11 VA sealed; and RV–38 VA inrush, 12 VA sealed.

The circuits of FIGS. 6A–6D are turned on when the microprocessor sets an output pin relatively low, allowing current to flow through the LED of an opto triac driver from +5 VDC. This current turns on the output diac, which allows current to flow into the gate of the output triac. This gate current turns on the triac and allows the output to sink current from RP, or YP for the AH output.

In the OFF state, the microprocessor output is relatively high. This turns the LED off, which turns the diac off. The absence of gate current into the triac keeps it in the blocking state, so the output sinks no current and the voltage stays at 0 VAC.

The 0.001 µF capacitor on the outputs and the high (400 V) breakdown voltage of the triacs provide protection from static, lightning, and transients, and shorts to 24 VAC. The RC snubber networks across the triacs are necessary to prevent commutating dV/dt from the inductive loads latching the triacs on and causing loss of control of the output.

Indoor Blower Enable (FE) Output

Figure 7:
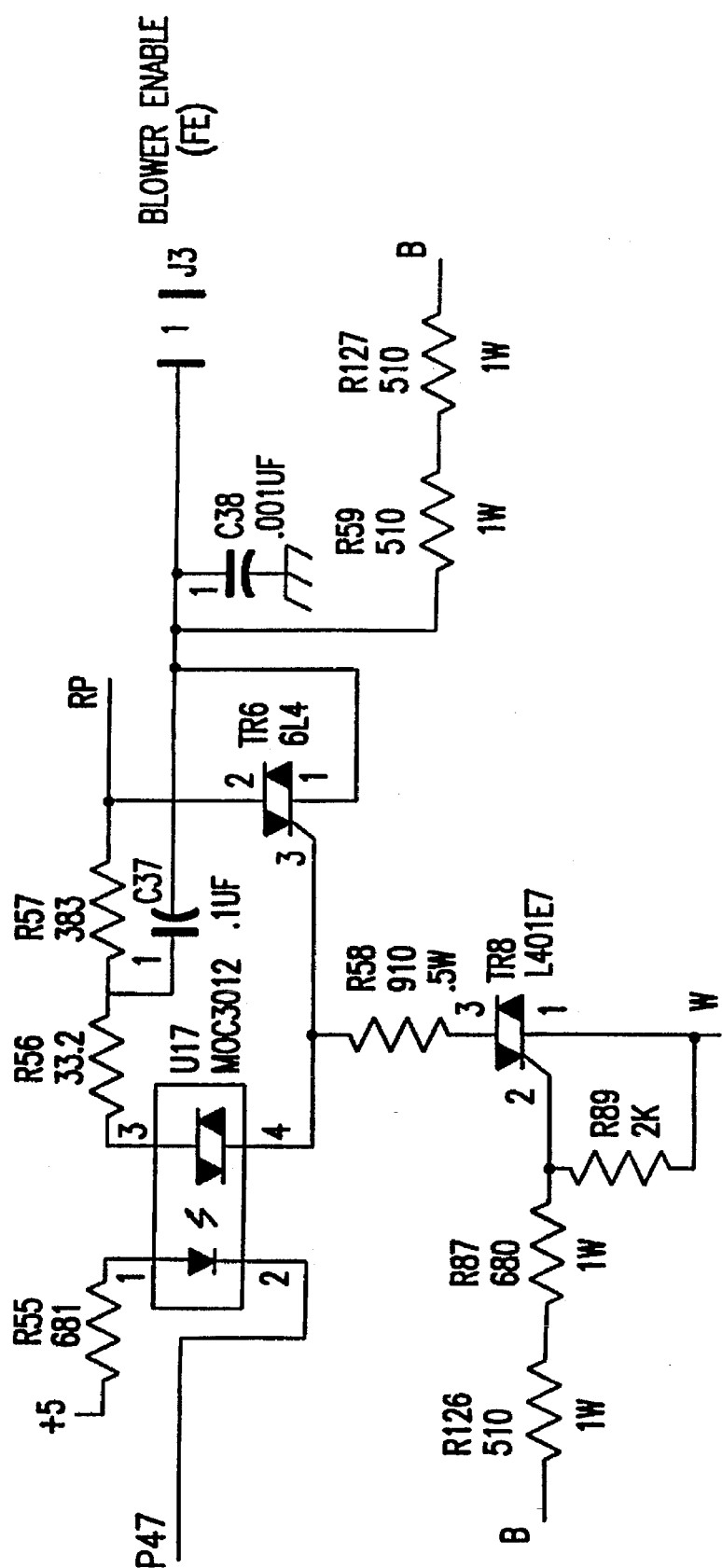
FIG. 7 is a schematic diagram of an indoor blower enable output circuit, according to one preferred embodiment of this invention.

With respect to the circuit as shown in FIG. 7, the FE output should be on (24 VAC, sinking current from RP into a resistive load of 1500 Ω) when the controlling output of the microprocessor P47 is relatively low ($\leq 0.45$ VDC). The output should also be on when the W line is relatively high ($15.6 \leq W \leq 28.6$ VAC).

The W input circuit should not be turned on (output $\leq 0.8$ VDC) when FE is enabled by the microprocessor and W is not commanded on. The current through triac TR8 plus the thermostat leakage current (~100 µA) should be less than 0.25 mA so that the W input is not turned on. The W line should be less than 0.25 VAC to avoid enabling the ID blower high speed select and the auxiliary heater.

The FE output should be off ($\leq 1.0$ VAC) when P47 is relatively high ($\geq 4.2$ VDC). W should also be off ($\leq 0.25$ VAC) unless externally commanded.

This circuit can be turned on by either of two mechanisms. The first is a low voltage at the microprocessor output turning on the opto triac driver and consequently turning on the output triac, similar to the FO, FS, RV and AH circuits.

The output can also be turned on by a relatively high voltage at W (nominally 24 VAC) which turns on TR8 and thus turns on TR6, similar to the CV circuit.

In order for the FE output to be off, the microprocessor output should be relatively high (~5 VDC) and the W line should be off ($\leq 0.25$ VAC). The output triac will be in the blocking state since it is not turned on by TR8 or the opto triac driver.

The 0.001 µF capacitor on the output and the relatively high (400 V) breakdown voltage of the triac provides protection from static, lightning, and transients, and shorts to 24 VAC. The RC snubber network across the triac is necessary to prevent commutating dV/dt from the inductive load latching the triac on and causing loss of control of the output.

Power-Up Reset Circuit

Figure 8:
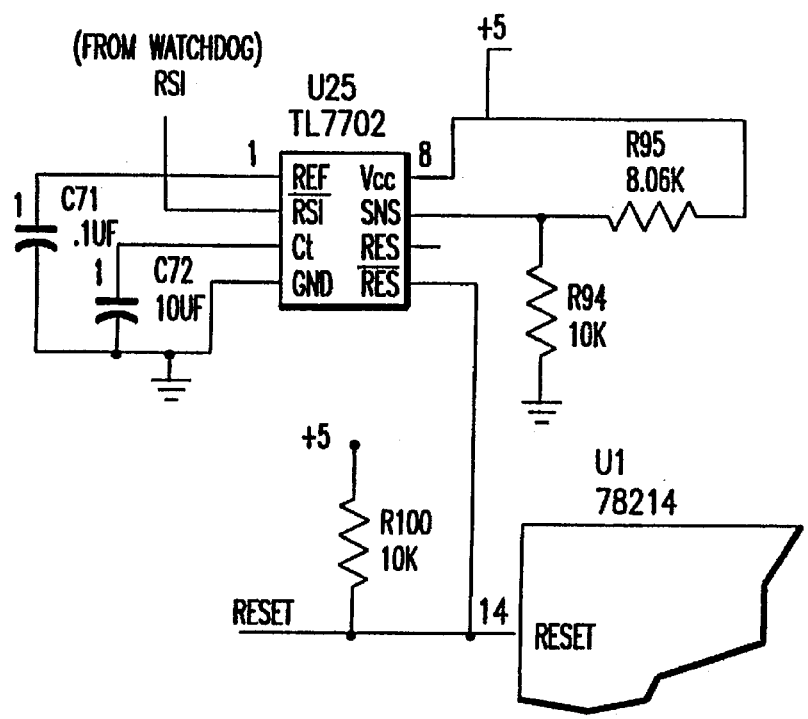
FIG. 8 is a schematic diagram of a power-up reset circuit, according to one preferred embodiment of this invention.

With respect to the circuit as shown in FIG. 8, the output of this circuit (RESET line of the microprocessor) should be relatively low ($\leq 0.8$ VDC) when power is applied to the microprocessor, and switch to relatively high ($\geq 2.2$ VDC) a minimum of 40 ms later. If at any time the +5 VDC supply to the microprocessor drops below 4.5 VDC, the output of the reset circuit should switch to low and stay low until 40 ms after the supply voltage rises above 4.5 VDC. In addition, a logic signal input should be provided that will cause RESET to go relatively low ($\leq 2$ µsec) when the input goes relatively low. The logic input should remain relatively low (for $\geq 150$ ns) to ensure that RESET goes low. RESET should remain relatively low (for $\leq 40$ ms) after the logic input returns to high.

According to one preferred embodiment of this invention, the microprocessor, on power-up reset, requires its RESET line to be held low for at least 40 ms after +5 VDC appears at the VDD terminals.

After this amount of time has passed, the RESET line should stay high unless another reset is desired. For this circuit, a power supply supervisory circuit is used. This chip according to one preferred embodiment has two sensing inputs, either of which can cause a change in the reset state.

The first sensing input is the SENSE input, a comparator which switches at 2.5 VDC. The SENSE input is tied to the +5 VDC line through a voltage divider. The resistor values are chosen so the comparator trips (2.5 VDC) when the +5 VDC line is at 4.5 VDC. When power is first applied to the controller, the RESET line is held low as the +5 VDC line increases toward 4.5 VDC. When the voltage reaches 4.5 VDC, the comparator trips and starts an internal timer. The value of this timer is set by an external delay capacitor (C72). After this timer has expired, the RESET line goes high and the microprocessor begins its program. The value of the delay capacitor is preferably chosen to ensure a delay of 40 ms plus a safety margin of 50%, over the worst case tolerance and temperature ratings of the capacitor.

The second input is the RESET-IN input. This input is tied to the output of the watchdog timer circuit. If the watchdog circuit ever falls low ($\leq 0.8$ VDC), the RESET line will be pulled low and remain low until the RESET-IN input is high ($\geq 2.0$ VDC) again. The delay mentioned above operates in this case as well.

Thermostat Checklight Circuit

Figure 9:
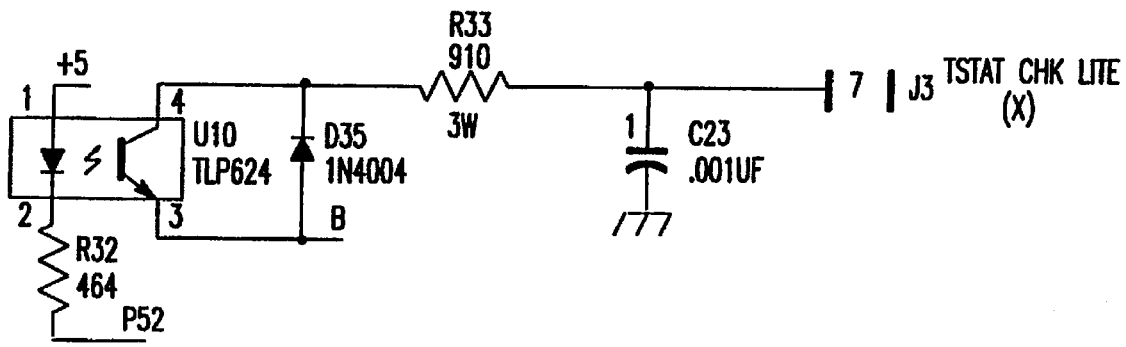
FIG. 9 is a schematic diagram of a thermostat checklight output circuit, according to one preferred embodiment of this invention.

With respect to the circuit as shown in FIG. 9, the output of this circuit should be on (sinking current from the thermostat through the LED) when P52 of the microprocessor is low ($\leq 0.45$ VDC) and should be off (not sinking current) when P52 is high ($\geq 4.2$ VDC). The circuit should be able to switch at a frequency of about 2 Hz.

When the microprocessor output is low, the optoisolator LED turns on, which enables current to flow through the output transistor. The current flows through the thermostat checklight from the 24 VAC of the thermostat, half-wave rectified through a diode and a 820 Ω resistor, turning on the checklight. When the microprocessor output is high, the optoisolator LED is turned off and current flow is blocked, keeping the checklight off.

The 0.001 µF capacitor on the output and the diode on the output of the optoisolator provide protection from static, lightning, and transients, and shorts to 24 VAC.

Watchdog Timer circuit

Figure 10:
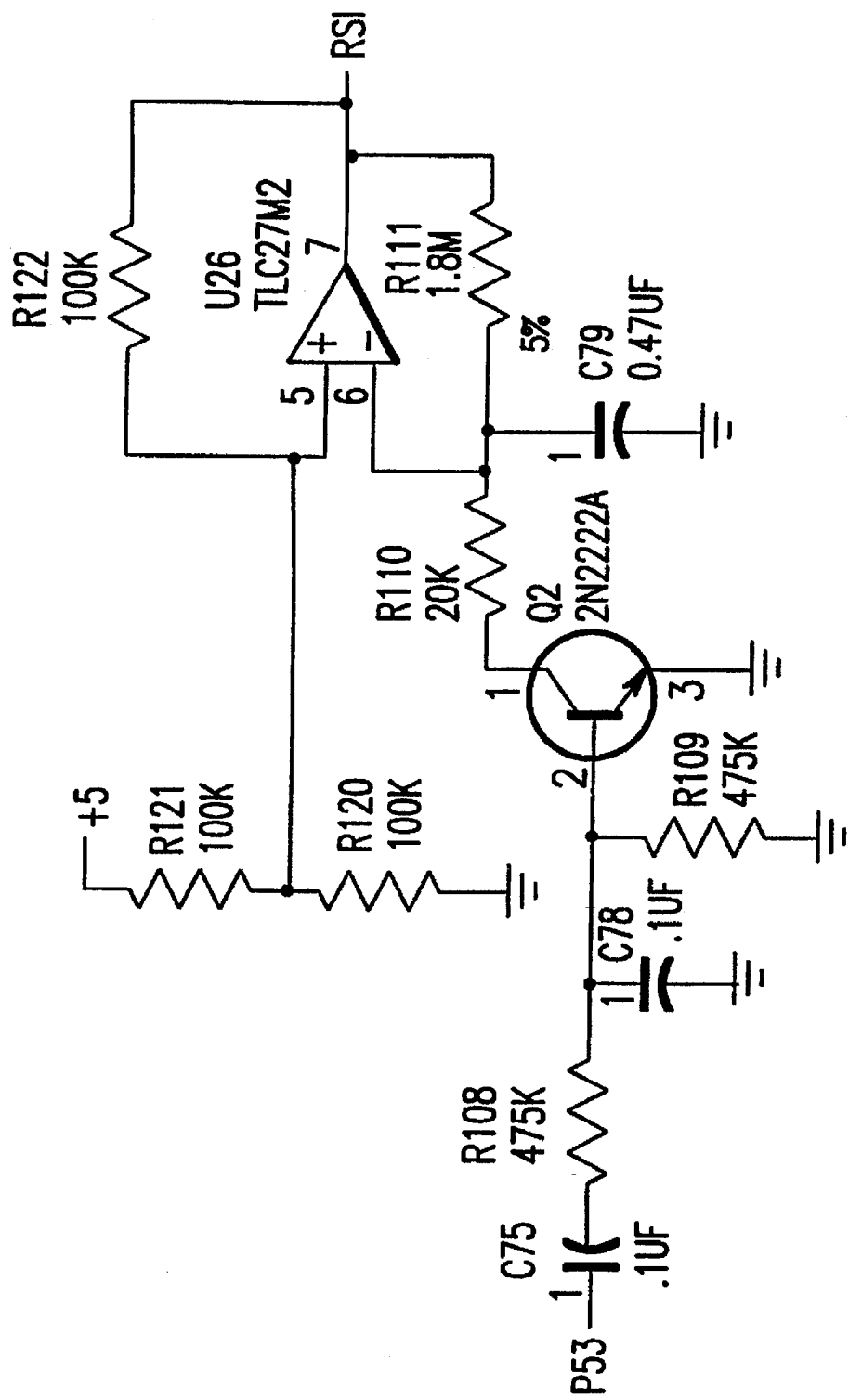
FIG. 10 is a schematic diagram of a timer circuit, according to one preferred embodiment of this invention.

With respect to the circuit description which follows, the input of this circuit is an output of the microprocessor P53, as shown in FIG. 10. This pin should provide a signal which ensures that the output of the circuit (RSI - the RESET-IN input of the supply voltage supervisory circuit) is maintained relatively high ($\geq 2.0$ VDC) during normal operation. When this pin voltage goes relatively low ($\leq 0.8$ VDC), the microprocessor will go through a reset. The watchdog circuit can be designed such that if the input P53 is struck high, low, or charging at an incorrect frequency, the output (RSI) should go low and reset the microprocessor.

On power-up, the output of the watchdog circuit (RSI input of the reset chip) is automatically pulled high to allow the microprocessor to run and start up the watchdog input P53. The voltage at the inverting input of the operational amplifier should be less than the voltage at the non-inverting input to ensure no reset. Without a valid pulse from P53, the inverting input is allowed to charge through the 1.8-Mµ resistor. If it is charged to a level higher than the voltage at the non-inverting terminal, the watchdog output will switch low and cause a microprocessor reset. According to one preferred embodiment of this invention, the pulse coming from the microprocessor at the watchdog input P53 is a 2-Hz square wave that turns on the transistor long enough to discharge the inverting terminal voltage. If the pulse at watchdog input P53 is too fast (or held low) the transistor will not turn on and a reset will occur. If the pulse is too slow (or held high) the transistor will not allow the inverting voltage to discharge and a reset will occur.

Input Voltage Monitor Circuit

Figure 11:
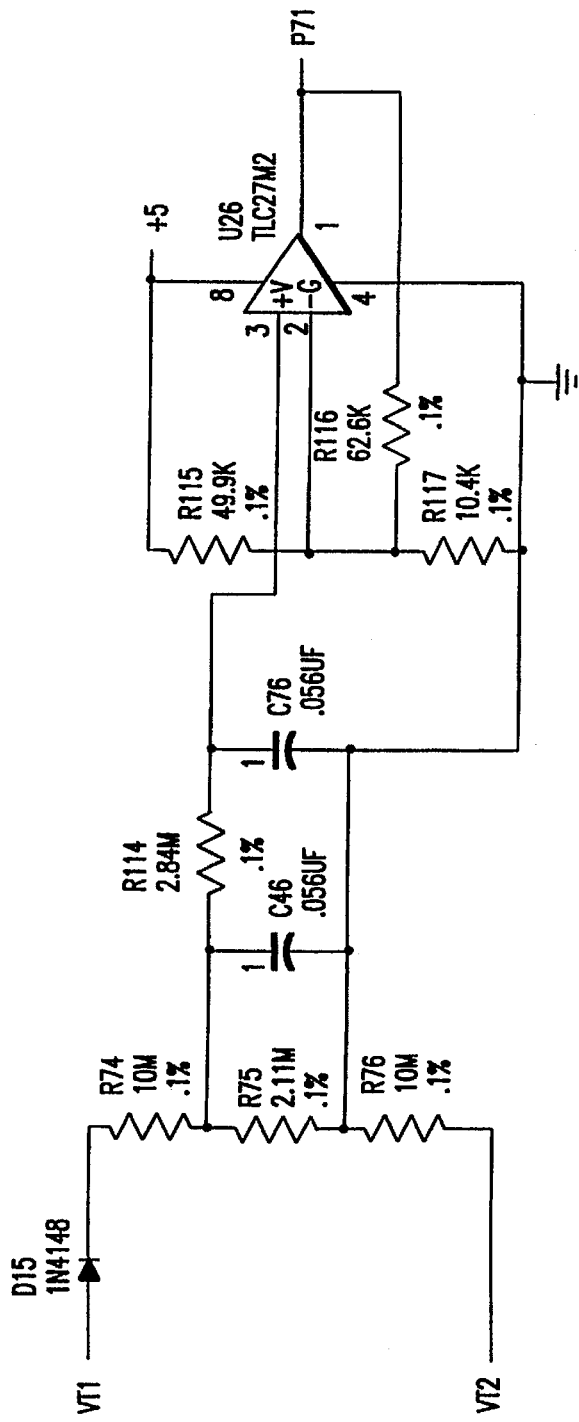
FIG. 11 is a schematic diagram of an input voltage monitor circuit, according to one preferred embodiment of this invention.

With respect to the circuit description which follows, the input of this circuit, as shown in FIG. 11, is the 24 VAC input voltage at the primary side of the isolation transformer. The output, tied to P71 (an A/D input) of the microprocessor, should fall within the following range for each of three values of AC input voltage: 17, 18.5, and 20 VAC:

<17 VAC: P71 <2.0 VDC

17 VAC: 2.0 ≦P71 2.5 VDC 18.5 VAC: 2.5 ≦P71 ≦3.0 VDC

20 VAC: 3.0 ≦P71 ≦3.5 VDC

>20 VAC: P71 ≦3.5 VDC

To modify the 24 VAC signal into a DC representation, the diode D15 is used to half-wave rectify the input voltage taken at the primary side of the isolation transformer. The +5 VDC circuitry is isolated from the 24 VAC circuitry with 10 MΩ resistors. A resistor, R75, takes a small sample of the half-wave voltage, and the CRC network filters the ripple of this signal. The filtered DC voltage is fed into a gain plus offset amplifier which performs the input to output conversion to meet the requirements above. The 0.001 ΩF capacitors on the AC input voltage lines provide protection from static, lightning, and transients.

Nonvolatile Memory (NVM)

Figure 12:
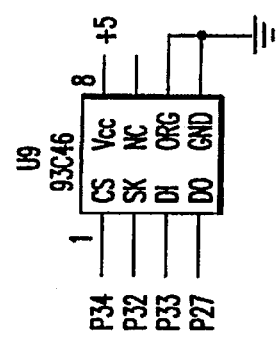
FIG. 12 is a block diagram of a non-volatile memory circuit, according to one preferred embodiment of this invention.

With respect to the circuit as shown in FIG. 12, the NVM circuit should enable the controller to write data serially out to an EEPROM and also retrieve data from the chip. For example, the controller can write data every 12 hours for a 10-year life cycle. Data should be accessible at any time via the SA. The EEPROM should retain its stored data indefinitely during power loss or brownout.

The controller sets P34 high (≧2.0 VDC) to enable the NVM chip at its CS input. When CS is relatively low (≦0.8 VDC), the chip is in standby mode and requires very little current (~100 µA). The ORG pin of the NVM chip is tied to ground to select the 128×8 memory configuration. The controller sets CS high to put the chip in an operational mode, then send out a clock signal of 695 Kbits/s to the SK input. Data and commands are sent from the controller to the DI input in serial form, and data from the NVM is sent back to the controller via the DO output in serial data form.

+5 VDC Power Supply Circuit

Figure 13:
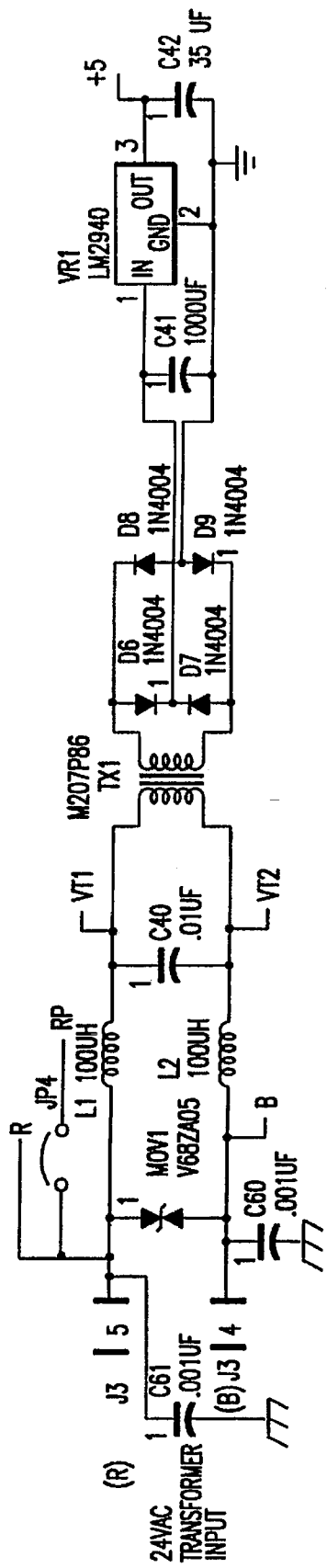
FIG. 13 is a schematic diagram of a direct current voltage power supply circuit, according to one preferred embodiment of this invention.

With respect to the circuit shown in FIG. 13 and the description which follows, the input to this circuit is an AC voltage, preferably from 17 to 30 VAC, nominally 24 VAC. The output is a regulated DC voltage, +5 VDC ±5%, with a maximum load current of 225 mA and an average load current of 125 mA.

The 24 VAC input is bridged by a MOV to suppress transients. Both the high and low sides of the AC voltage then go through an LC line filter. The filtered 24 VAC is then input to the primary of an isolation stepdown transformer. The turns ratio is approximately 2:1 so the secondary voltage is ~12 VAC. This voltage is full-wave rectified with a diode bridge and filtered with a 1000 µF capacitor. The filtered unregulated DC voltage is fed into a +5 VDC regulator. The output of this regulator is also filtered and becomes the +5 VDC supply for the controller.

The 0.001 µF. capacitors on the inputs, the MOV, inductors, and isolation transformer all provide protection from static, lightning, and transients, and shorts to 24 VAC.

+16 VDC Power Supply Circuit

Figure 14:
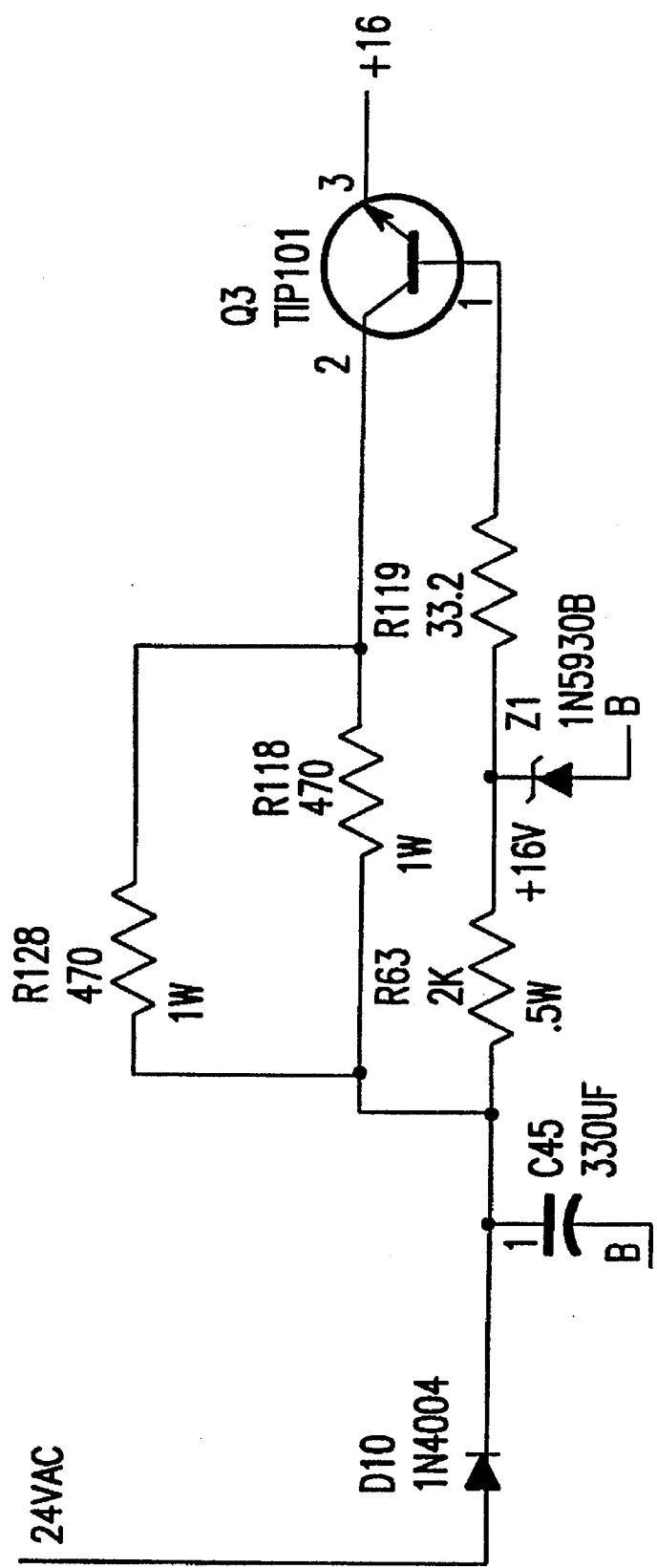
FIG. 14 is a schematic diagram of a direct current voltage power supply circuit, according to another preferred embodiment of this invention.

With respect to the circuit description which follows, the input of this circuit, as shown in FIG. 14, is the 24 VAC voltage (ranges from 17 to 30 VAC) at the primary side of the isolation transformer. The output is approximately +16 VDC, with a maximum load of 60 mA and an average load of 35 mA.

The power supply takes its input from the 24 VAC primary. This AC voltage is half-wave rectified through a diode and filtered by a 330 µF capacitor. This unregulated DC voltage is fed through a current limiting resistor to a zener diode with zener voltage nominally 16 VDC (±10%). This voltage turns on the base of a transistor which draws its supply current from the unregulated DC voltage. The emitter of this transistor (at ~15.3 VDC) is the source of the +16 VDC power supply. The 0.001 µF capacitors on the 24 VAC inputs provide protection from static, lightning, and transients, and shorts to 24 VAC.

Communications Interface Circuits (R×D, T×D)

Figure 15:
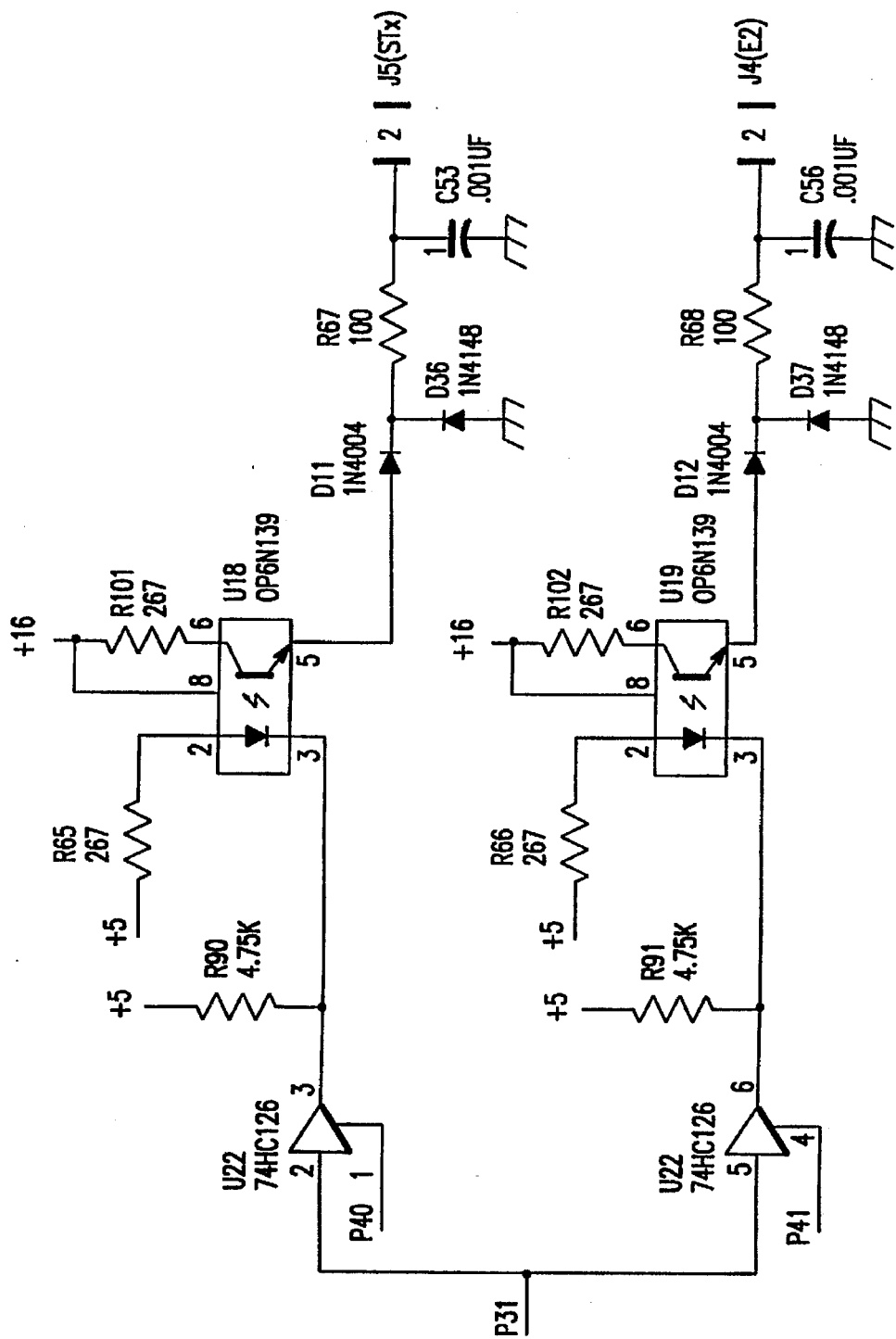
FIG. 15 is a schematic diagram of a communications interface circuit, according to one preferred embodiment of this invention.
Figure 16:
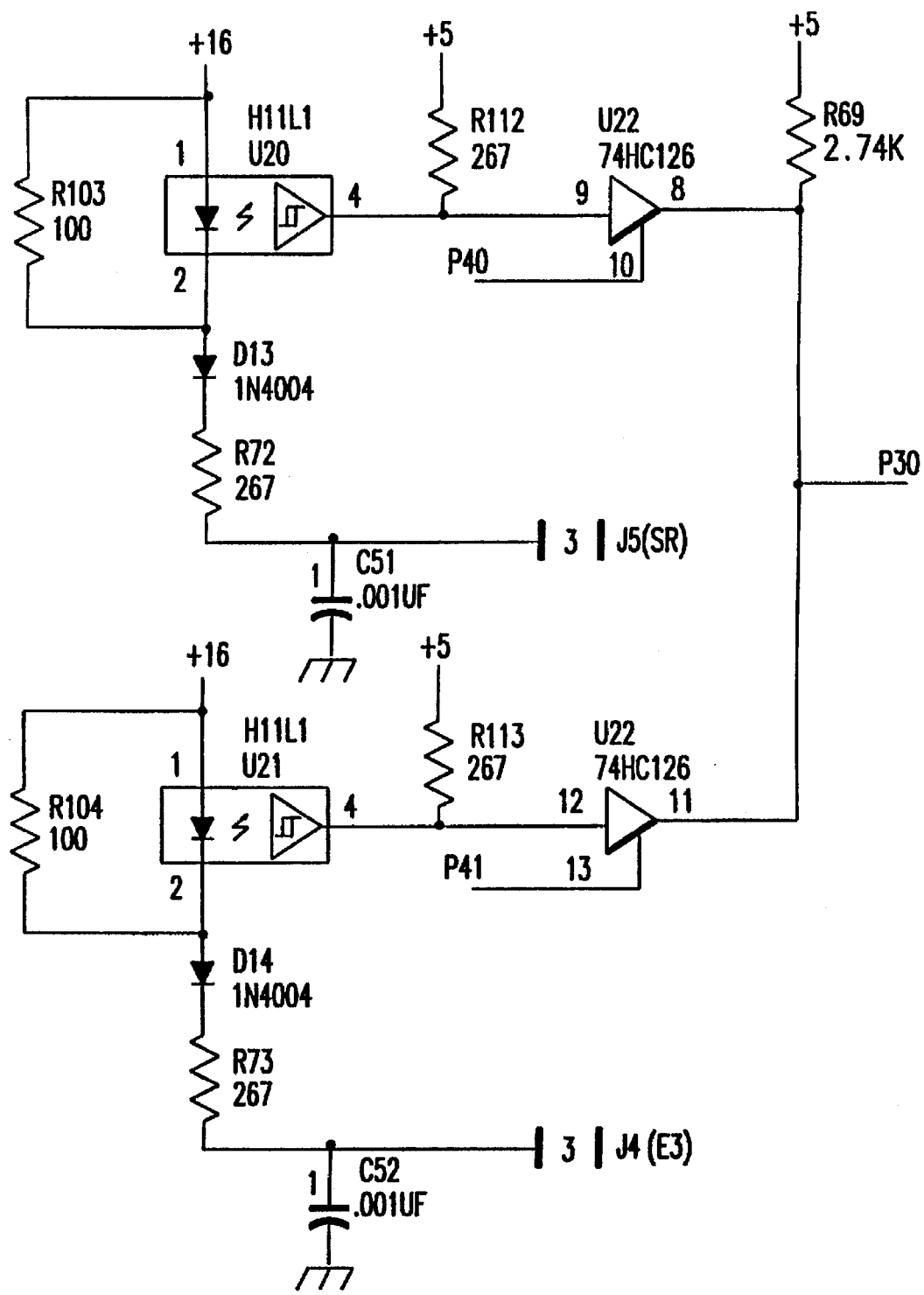
FIG. 16 is a schematic diagram of a communications interface circuit, according to another preferred embodiment of this invention.

With respect to the circuit as shown in FIGS. 15 and 16, the Transmit and Receive communications circuits communicate with two different devices: the ECS and the SA. A device select is provided to determine which device to transmit to or to receive from. The communicated data is preferably in serial form at 4800 baud. The rise and fall times ($T_r$ and $T_f$) of the circuits are about ≦60 µs, and the times high and low ($T_{high}$ and $T_{low}$) are about ≧137 µs. The total bit time ($T_{bit}$) should be between approximately 414 and 418 µs (4800 baud). When T×D is relatively high (≧2.2 VDC), the transmit circuit should be off (current flowing into the device ≦7 mA). When T×D is relatively low (≦0.8 VDC), the circuit should be on (current flowing into device between 17 and 28 mA). When current is not flowing in the receive circuit, R×D should be relatively high (≧2.2 VDC) and when current is flowing, R×D should be relatively low (≦0.8 VDC). The controller should provide the current source for communications. The current in the on state of these circuits should be ≧17 mA to ensure fast switching.

The transmit circuit comprises two identical circuits with the inputs multiplexed. This multiplexing is performed by a gated non-inverting buffer. Two microprocessor outputs, P40 and P41, are used for this function. If P40 is relatively high (≧4.2 VDC) the SA is selected. If P41 is high, the ECS is selected. A device is deselected if the pin voltage is relatively low (≦0.8 VDC). T×D (transmit data from the microprocessor) is passed through the buffer of the active circuit, and controls the input LED of an optoisolator. If T×D is relatively low (≦0.8 VDC) the LED will turn on, and if T×D is relatively high (≧2.2 VDC) the LED will turn off. The output transistors of these optoisolators source current out into the devices ECS and SA. This current comes from the +16 VDC supply. The input at each device is a resistor and the LED of an optoisolator. When the current flowing through the output transistor into the LED at the device is between 17 and 28 mA, the LED turns on an output transistor and is interpreted as a "zero". When the current is ≦7 mA, the signal is interpreted as a "one". The resistors in the output leg set the current to achieve optimum switching characteristics.

The receive circuit operates like the inverse of the transmit circuit. The same multiplexing signals are present (P40 and P41). In this case, the device ECS or SA is sending data to the controller. The device turns on and off the LED of an optoisolator to send data. The output transistor of this optoisolator is tied through a resistor and diode to the receive circuit on the controller. When the device LED is on, the controller is allowed to source current into the output transistor of the device. This current also turns on the LED of an optoisolator at the controller, causing R×D to go low. When no current is flowing, the controller optoisolator is off, keeping R×D relatively high.

The 0.001 μF capacitors on the inputs/outputs and the diodes in series in the input/output lines provide protection from static, lightning, and transients, and shorts to 24 VAC.

LL, OD, ID Temperature A/D Input Circuits

Figure 17:
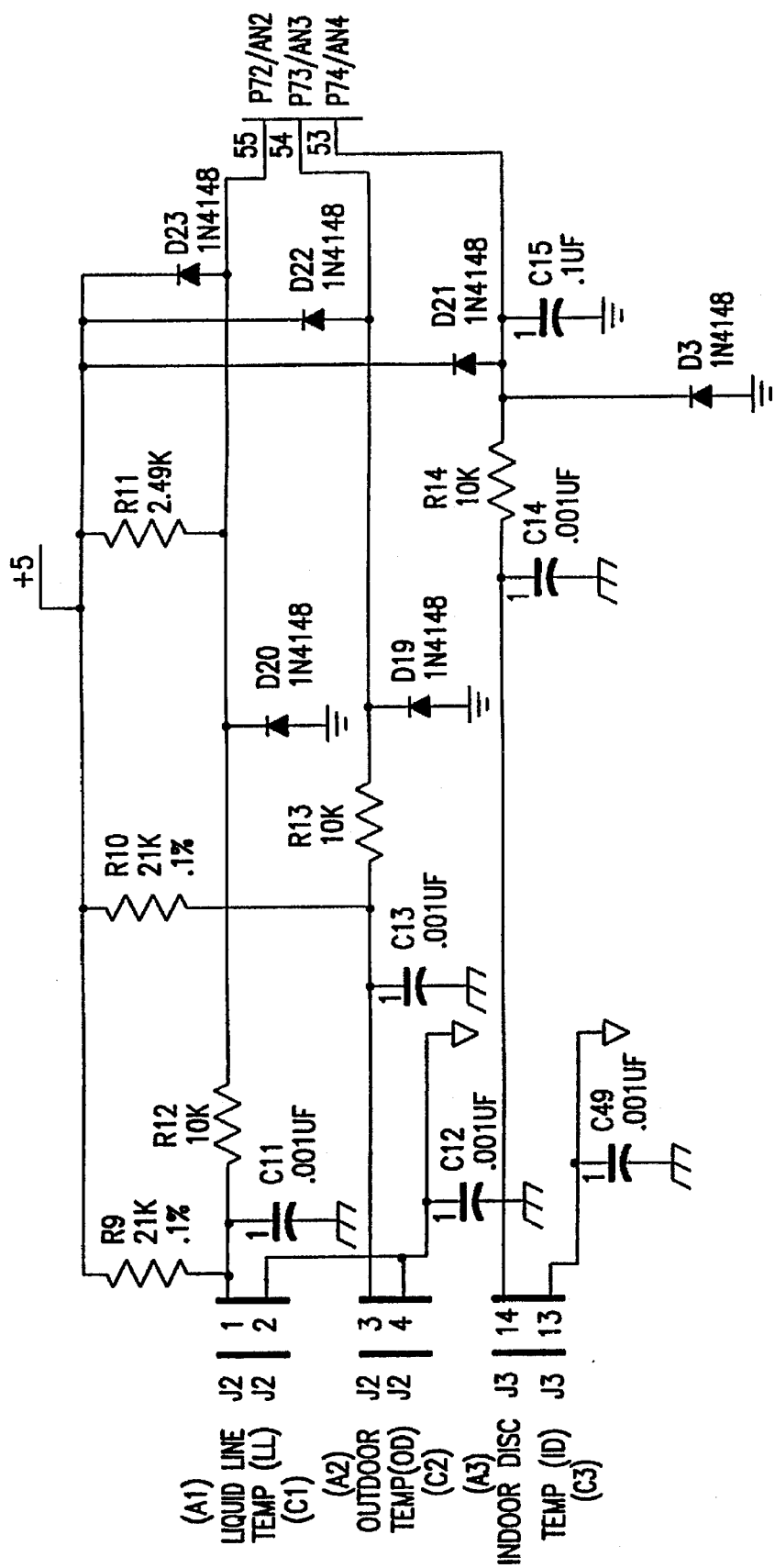
FIG. 17 is a schematic diagram showing various temperature sensor subcircuits, according to one preferred embodiment of this invention.

With respect to the circuit description which follows, the output of these circuits shown in FIG. 17, connected to A/D inputs (P72, P73, P74) of the microprocessor are preferably scaled such that the temperature sensed (for example by a thermistor) produces a known voltage which is translated by a table in software to a temperature.

The Fenwall thermistors used, for example, have a resistance of 10 kΩ at 25° C., and vary inversely with temperature. The measurement circuit comprises a voltage divider with a precision resistor pulled up to +5 VDC ($V_{ref}$) and the thermistor with one side tied to ground. The voltage at the tiepoint of the two resistors is the voltage reading used to compute or calculate temperature from a lookup table. If the sensor is open-circuited, the voltage will be at the +5 VDC rail, and if the sensor is short-circuited, the voltage will be at ground.

The 0.001 μF capacitors on the inputs provide protection from static, lightning, and transients. The 10 kΩ input resistors safeguard the microprocessor A/D inputs against 24 VAC shorts, and the diodes tied to the +5 VDC and ground lines protect the A/D inputs from any voltages out of safe operating range.

Indoor Blower Speed (F) Circuit

Figure 18:
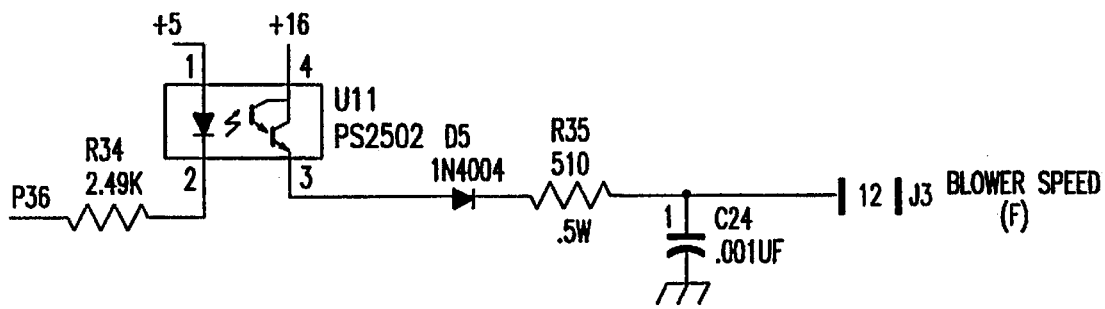
FIG. 18 is a schematic diagram of an indoor blower speed output circuit, according to one preferred embodiment of this invention.
Figure 19A:
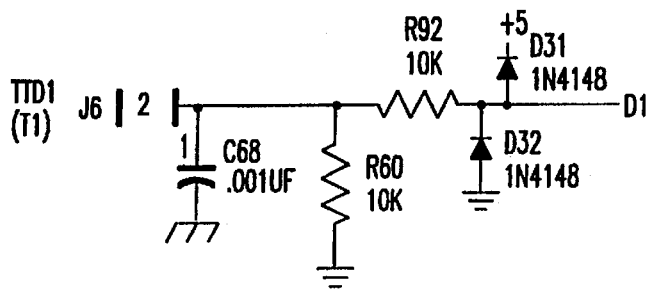
FIGS. 19A–19D are schematic diagrams of time to defrost select input circuits, according to various preferred embodiments of this invention.
Figure 19B:
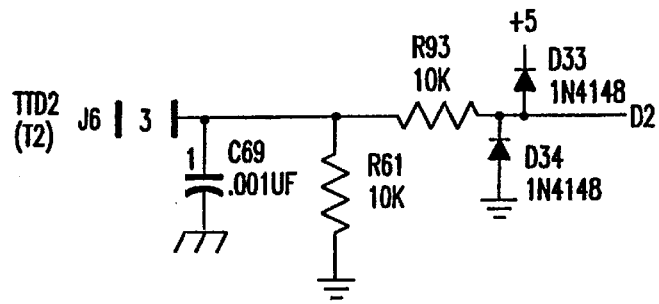
Figure 19C:
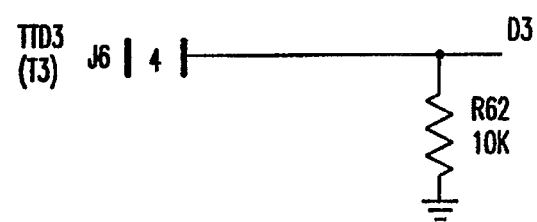
Figure 19D:

With respect to the circuit description which follows, the output of this circuit, as shown in FIG. 18, is preferably on (sourcing current from the +16 VDC supply) when P36 of the microprocessor is relatively low (≦0.8 VDC) and is preferably off (not sourcing current) when P36 is relatively high (≧4.2 VDC). The circuit should be able to switch at a frequency up to 150 Hz, and drive a resistive load of 1500Ω.

When the microprocessor output P36 is relatively high, the optoisolator LED is turned off, which keeps the darlington pair output off, not allowing any current flow into the indoor blower speed circuit. When P3.6 is relatively low, the LED turns on which allows current flow from the +16 VDC circuit through the darlington pair into the blower speed circuit.

The 0.001 μF capacitor on the output provides protection from static, lightning, and transients. The series diode and output resistor safeguard the optoisolator against 24 VAC shorts.

Defrost Select Inputs T1, T2, T3

With respect to the circuit description which follows, the output of each defrost select input, as shown in FIGS. 19A–19D, connected to either a discrete input P64, P65 or an A/D input P66 of the microprocessor, should be relatively high (≧2.2 VDC) when connected to the select jumper J6-1 and should be relatively low (≦0.8 VDC) when not connected.

Out of the three defrost inputs T1, T2, T3, one is selected by Jumper to P1 (the defrost select pin). This input is connected to +5 VDC through a voltage divider which sets the voltage at ~4.54 VDC. The two inputs which are not connected to P1 are pulled down to ground through a 10 kΩ resistor.

The 0.001 μF capacitors on the inputs provide protection from static, lightning, and transients. The 100 kΩ input resistors safeguard the microprocessor inputs against 24 VAC shorts, and the diodes tied to the +5 VDC and ground lines protect the inputs from any voltages out of safe operating range.

GHPC and System LEDs

Figure 20:
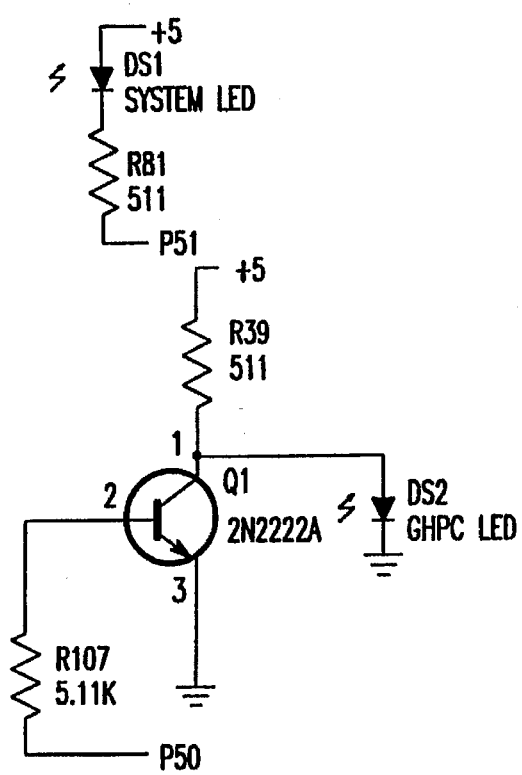
FIG. 20 is a schematic diagram of the GHPC and system LED drive circuits, according to one preferred embodiment of this invention.

With respect to the circuit as shown in FIG. 20, the GHPC LED is turned on at system power-up or if P50 (output pin of the microprocessor) is relatively low (≦0.45 VDC) and off if P50 is relatively high (≧4.2 VDC).

The SYSTEM LED should be turned on if P51 is relatively low (≦.045 VDC) and off if P51 is relatively high (≧4.2 VDC).

When P51 is relatively low, current from +5 VDC is allowed to flow through the SYSTEM LED, turning it on. The series resistor R81 limits the current flowing through the LED and into the microprocessor output pin.

The GHPC LED operates differently. On power-up, P50 is in a high-impedance state, which ensures that the transistor Q1 is off. This directs all the current from +5 VDC through the GHPC LED, turning it on. When the software has booted and P50 has been configured correctly as an output port, the controller can control the state of the LED. If P50 is relatively low, the transistor remains off and the LED will stay on. If P50 goes relatively high, the transistor will turn on. The current from +5 VDC will be redirected from the LED into the transistor, and the LED will turn off.

LA (Low Pressure Cutout) Sense

Figure 21:
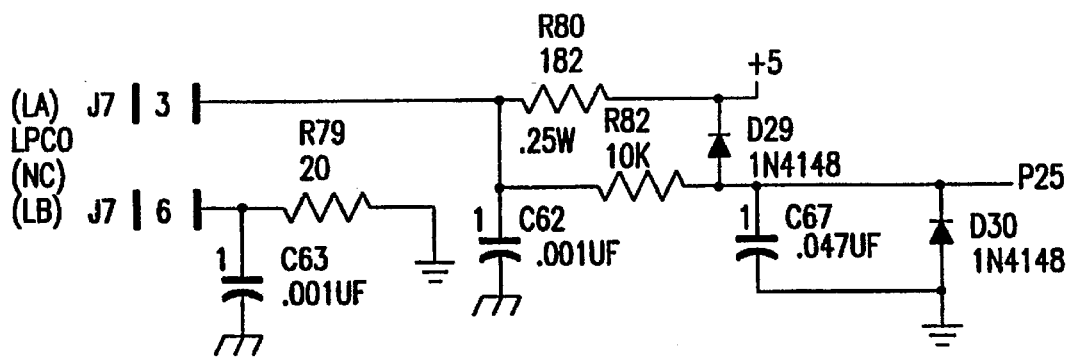
FIG. 21 is a schematic diagram of a low pressure cutout sensor input circuit, according to one preferred embodiment of this invention.

With respect to the circuit description which follows, the output of this circuit as shown in FIG. 21, tied to P25 of the microprocessor, is preferably relatively low (≦0.8 VDC) during normal operation (low pressure cutout switch closed), and relatively high (≧4.2 VDC) during a fault condition (switch open).

The circuit should drive at least 25 mA through the LPCO switch contacts when they are closed to prevent corrosion from building up and affecting the reliability of the switch.

The LA circuit is basically a voltage divider comprising a 182 Ω resistor tied to +5 VDC and a 20+ resistor tied to ground. The low pressure cutout switch connects or disconnects these two resistors. When the switch is closed, ~25 mA of current flows through the contacts. The microprocessor input P25 is connected to the 182Ω resistor. When the switch is closed (normal condition) the voltage at P25 is relatively low (~0.45 VDC). When the switch opens (during a fault condition) the voltage is pulled up to +5 VDC.

The 0.001 μF capacitors on the inputs provide protection from static, lightning, and transients. The 10 KΩ input resistor safeguards the microprocessor input against 24 VAC shorts, and the diodes tied to the +5 VDC and ground lines protect the input from any voltages out of safe operating range.

General Description of Software Design

The controller of this invention preferably operates with variable capacity control. According to one preferred embodiment of this invention, the controller implements particular algorithms for high-efficiency performance of the heat pump system, while providing variable capacity heating/cooling, for example, in response to a thermostat output signal. The programmed algorithms preferably provide multiple stages or performance levels based upon an output signal, for example, from a thermostat, which represents requested heating/cooling capacity requirements from the heat pump, in response to a load offered by a conditioned space, such as a house, other residential facility or commercial installation. In one preferred embodiment of this invention, the controller operates in three stages wherein the first stage and the third stage represent ON and OFF, respectively, requests for minimum capacity and maximum capacity. The second stage provides variable capacity, from 0% to 100%, between the minimum capacity and the maximum capacity.

The algorithms of the controller of this invention determine the appropriate control for the compressor speed, the indoor blower speed and the outdoor fan speed, for example, for obtaining efficient overall performance of the heat pump, while meeting dynamic and steady-state load conditions. The controller of this invention can adequately provide correct control for normal operating conditions, as well as extreme operating conditions associated with outdoor temperatures, to provide useful variable capacity control down to at least −10° F. outdoor air temperatures.

Figure 22:
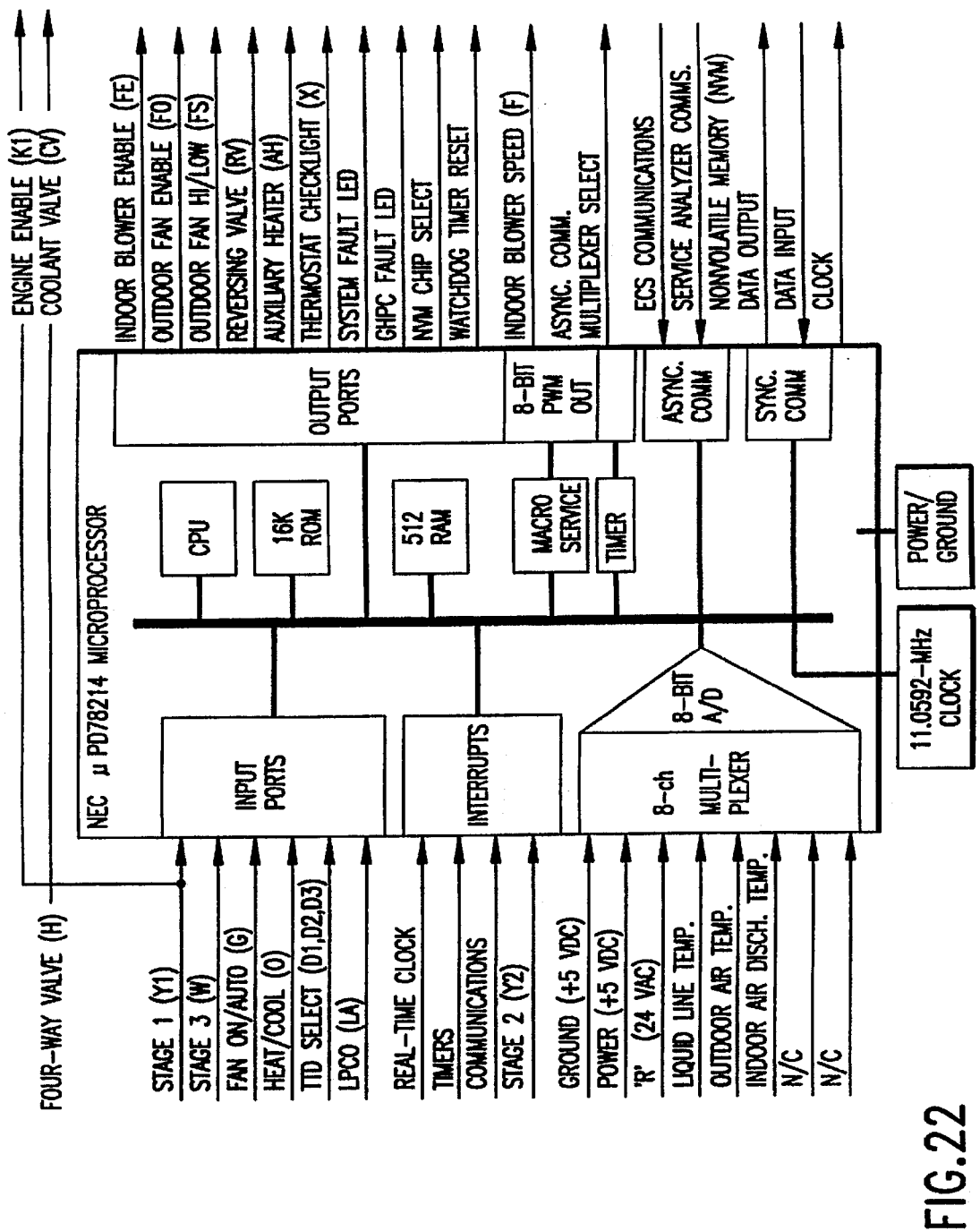
FIG. 22 is a block diagram showing various inputs and various outputs of a microprocessor, according to one preferred embodiment of this invention.

A commercially available microcontroller is used, such as a NEC μPD78214, having a suitable programming language and compiler availability and suitable hardware capabilities. For example, the NEC μPD78214 contains the following features on a single IC, as shown in FIG. 22: an 8-bit ALU; four sets of general-purpose registers; 512 bytes of RAM; 16 Kbytes of EPROM; an eight-channel, 8-bit A/D converter; a four-phase stepper motor control capability; a pulse-width-modulated (PWM) output capability; asynchronous and synchronous serial communications ports; 5×8-bit ports for input/output; and three timer/counter units (2×8-bit, 1×16-bit).

The thermostat is a prototype three-stage heat/two-stage cool thermostat with a variable-speed second stage in heating and cooling. It is designed to complement the variable-capacity characteristics of the heat pump provided by engine throttle control. With respect to the controller, the thermostat provides five input signals and one output signal.

Indoor Blower (ECM)

Variable-capacity heat/cool exchange between the compressor and the conditioned space is provided with any suitable electronically commutated motor (ECM) controller for the indoor blower. For most normal operating conditions, the indoor blower speed is controlled by the controller to be proportional to the compressor capacity, which may be proportional to the engine RPM. With respect to the controller, the ECM motor control has two discrete outputs and one variable control output, as shown in FIG. 29.

The high-speed control signal is directly connected to the thermostat Stage 3 signal via the heat pump wiring harness, with no connection on the controller, to provide for the Emergency Heat operation mode of the heat pump system, which actuates the auxiliary heater and indoor blower directly with the thermostat Stage 3 output signal. The controller does not provide any control action for this mode. Emergency Heat is selected manually on the thermostat subbase in the case the engine fails to run and/or the controller is inoperable. This backup mode of operation ensures that heat is delivered to a load, such as a house, during a heating season or period.

Engine Control System (ECS)

The ECS is responsible for all direct engine control and monitoring functions. It interfaces to the controller via an asynchronous serial communications interface, preferably multiplexed with the service analyzer.

The character format used is 4800-baud, 8-bit ASCII, 1 stop bit, no parity.

Commands from the controller and data from the ECS are exchanged by means of a custom communications protocol implementing levels 2 (Data Link) and 3 (Network) of the ISO seven-level protocol model. The controller is the master device and initiates each message exchange. The ECS is a slave device and responds to command messages from the controller; it does not initiate message exchanges.

The Engine On (E1) signal is not originated by the controller; it is stage 1 from the thermostat passed to the ECS via printed circuit board traces. The ECS Multiplex Select signal is only used internally to the controller and is not present at any connector pin.

Service Analyzer

The service analyzer provides the user interface for all data/status display and manual mode commands. It interfaces to the controller via an asynchronous serial communications interface, preferably multiplexed with the ECS.

The character format used is 4800-baud, 8-bit ASCII, 1 stop bit, no parity.

Commands from the service analyzer and data from the controller are exchanged with a custom communications protocol implementing levels 2 (Data Link) and 3 (Network) of the ISO seven-level protocol model. The service analyzer initiates each message exchange. The controller responds to data request and manual mode command messages from the service analyzer by sending the requested data/status information or providing appropriate control for manual mode commands.

The service analyzer stage 1 and heat/cool signals are preferably "wire-ORed" with the thermostat signals on the controller printed wiring board before input signal conditioning circuitry; hence, the controller cannot distinguish the source of these signals. This necessitates special procedures when using manual mode commands. The SA multiplex select signal is only used internally to the controller and is not present on any connector pin.

Software Overview

The controller provides multiloop control for the heat pump system. Various control loops may be open or closed and provide singly, or in combination either proportional, integral, or differential control. Each control loop, signal interface, and associated software is identified and categorized for reference, as shown in FIG. 32.

Figure 23:
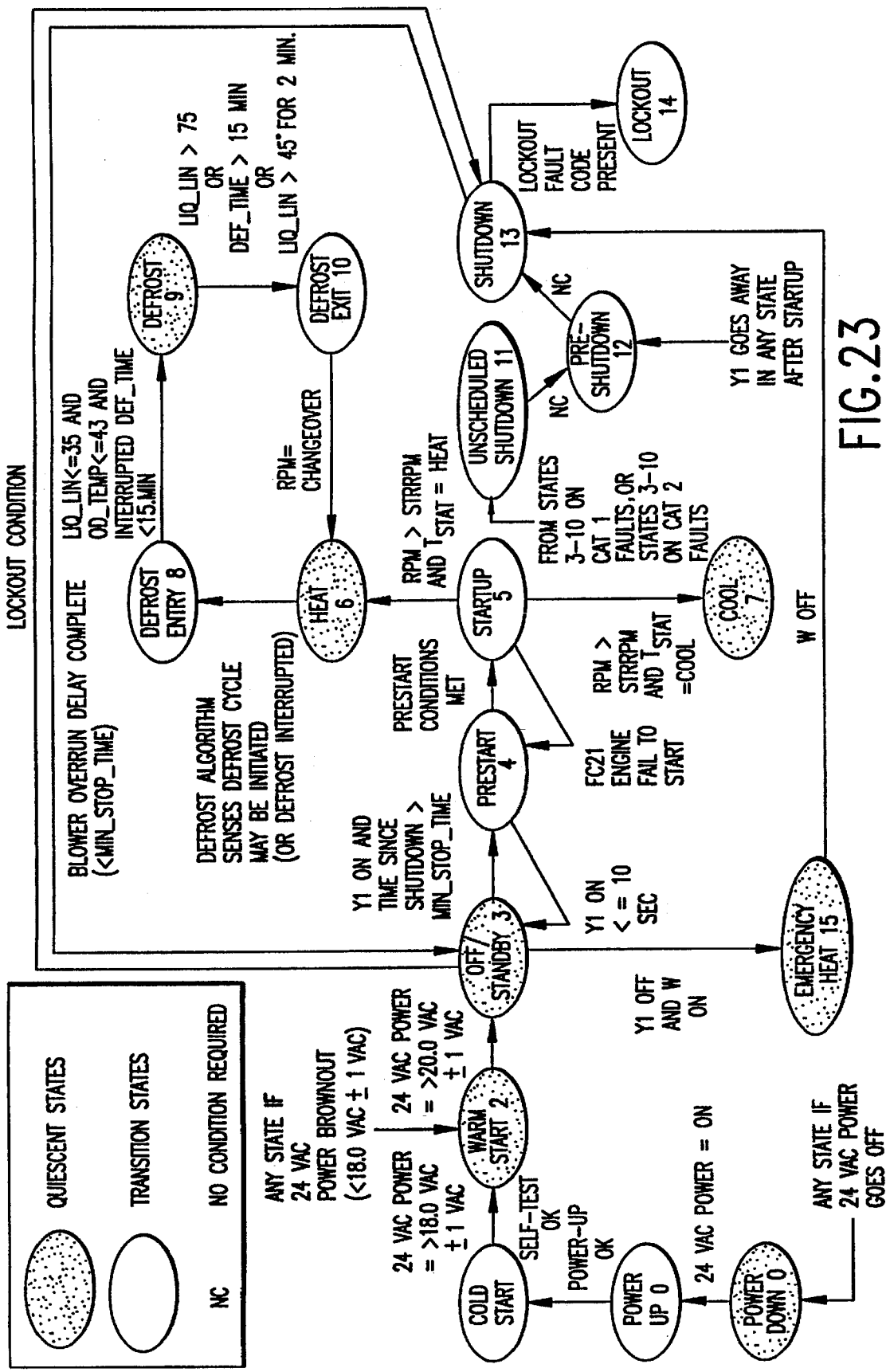
FIG. 23 is a diagrammatic view of a flow diagram showing the sequence of various operational states for control of the heat pump system, according to one preferred embodiment of this invention.

The controller software is designed to meet appropriate requirements through use of a modular software partitioning approach, which collects the control code for each output into a unique software module. The appropriate control action performed by the controller is determined on the basis of an event-driven state machine, as shown in FIG. 23. In each state, the type of control and the control parameters are altered to provide appropriate controller system behavior. In FIG. 23, all possible control states are identified, and transition criteria to another state are summarized.

The controller according to this invention provides discrete/multivariable control loop processing for each output based on the current state of the controller and on real-time control input variable values. Since the control processing may vary with state, the type of control for each output may be varied by state and corresponding input variables to provide positive control of at least one output signal.

Figure 24:
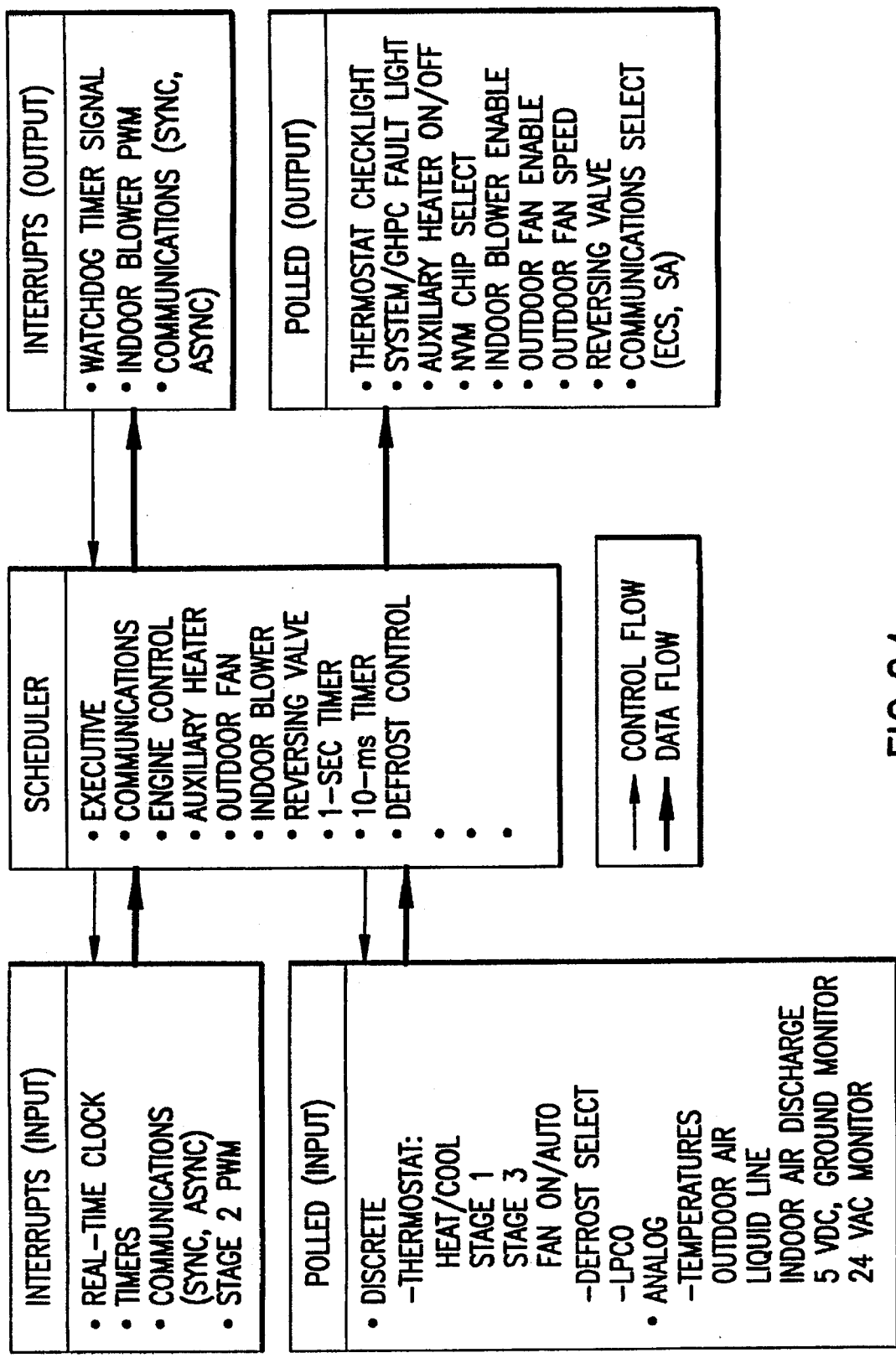
FIG. 24 shows a utilization of microprocessor functions logic for control and data flow among and between various subcircuits and functions, according to one preferred embodiment of this invention.

The controller of this invention provides real-time control of the heat pump, responding to time-sensitive, event-sensitive and environment-sensitive inputs to determine the current operational state and the appropriate control types and parameters. In the context of the controller, "real-time" is defined as providing an approximately 1-sec time base for most control loop processing. It is apparent that within the context of this invention, "real-time" is preferably measured in about 1 to 10 seconds, as opposed to 1–10 minutes or 1–10 microseconds. However, it is apparent that "real-time" can in fact be measured in microseconds, even in the range of 1–10 microseconds, for example, without departing from the preferred results obtained with this invention. Generally included in the "real-time" definition are response times that are perceived as "immediate" by a human. Finally, internal overhead processing (e.g., watchdog refresh, self-test, scheduler, etc.) should be completed in a timely manner to permit the real-time control to be performed. FIG. 24 illustrates the software partitioning design to achieve the desired levels of real-time performance.

To implement real-time control, the controller performs a non-control-related (e.g., overhead) processing to implement the necessary mechanisms for proper heat pump control. The non-control-related processes include: task scheduler; communications with the ECS; communications with the service analyzer (SA); self-test routines; nonvolatile memory (NVM) access; and on-board LED displays.

Figure 25:
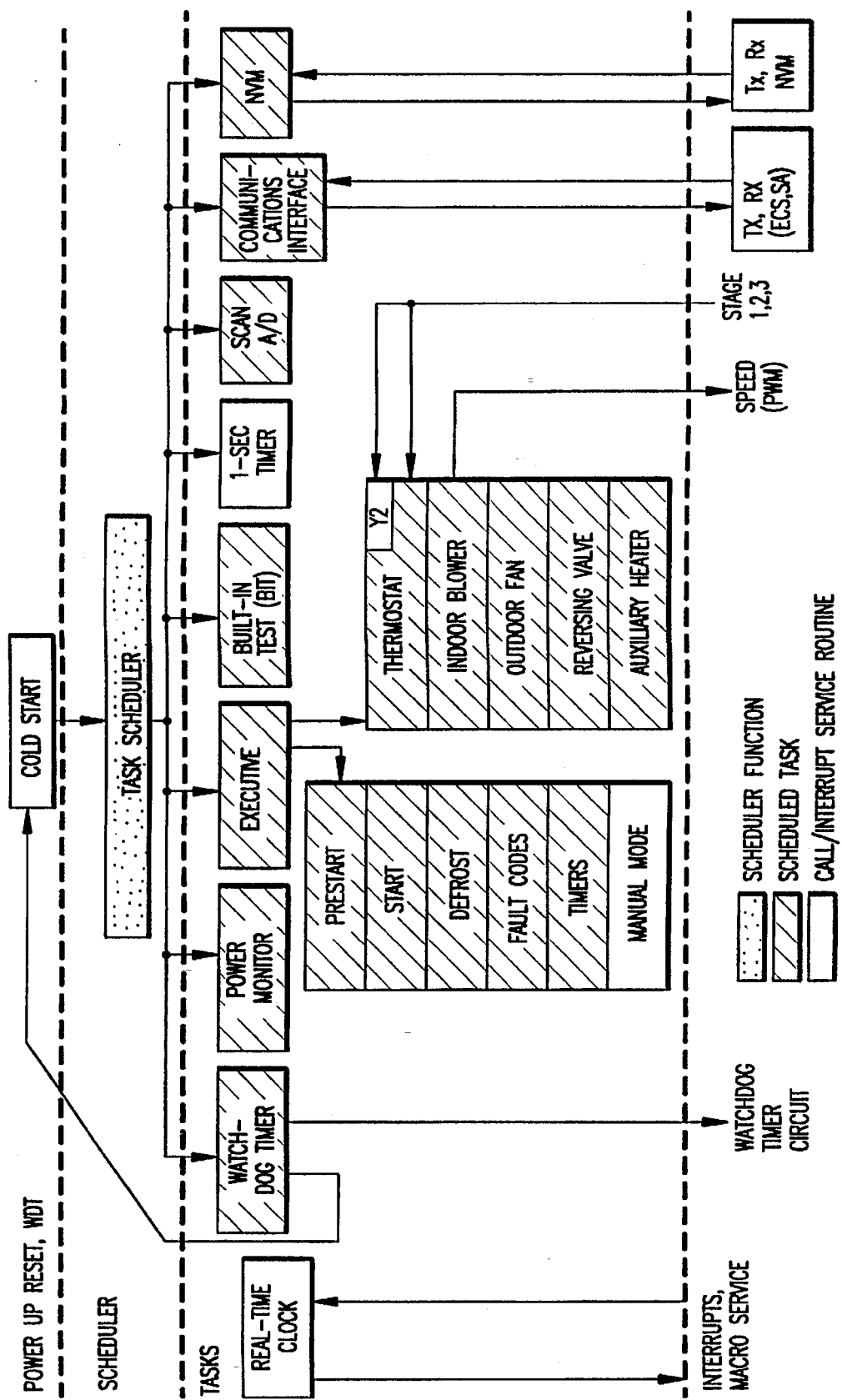
FIG. 25 is a general block diagram showing control flow among and between certain software components, according to one preferred embodiment of this invention.
Figure 26A:
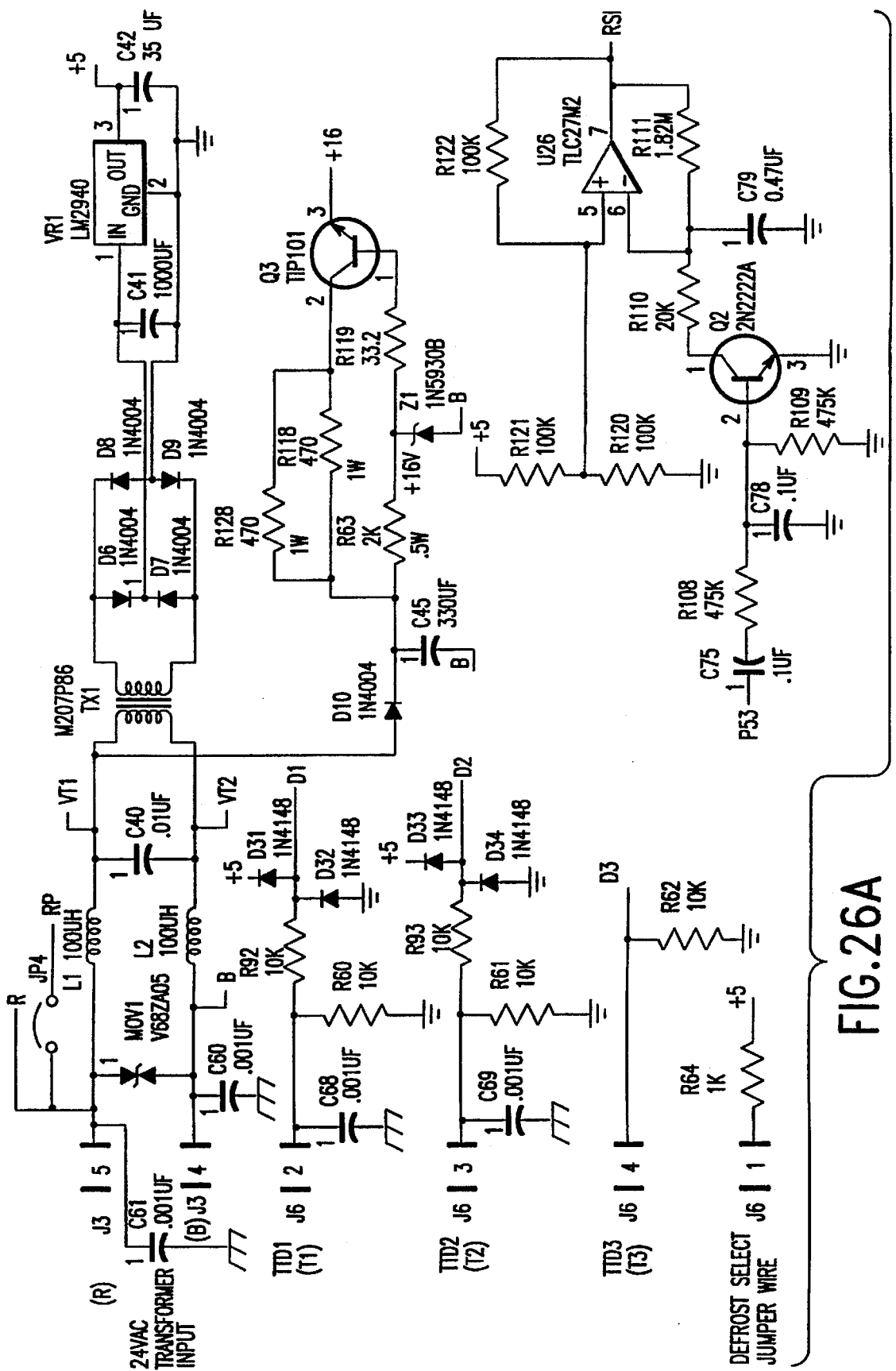
FIGS. 26A–26D show general layouts of the schematic diagrams of various subcircuits, according to one preferred embodiment of this invention.
Figure 26B:
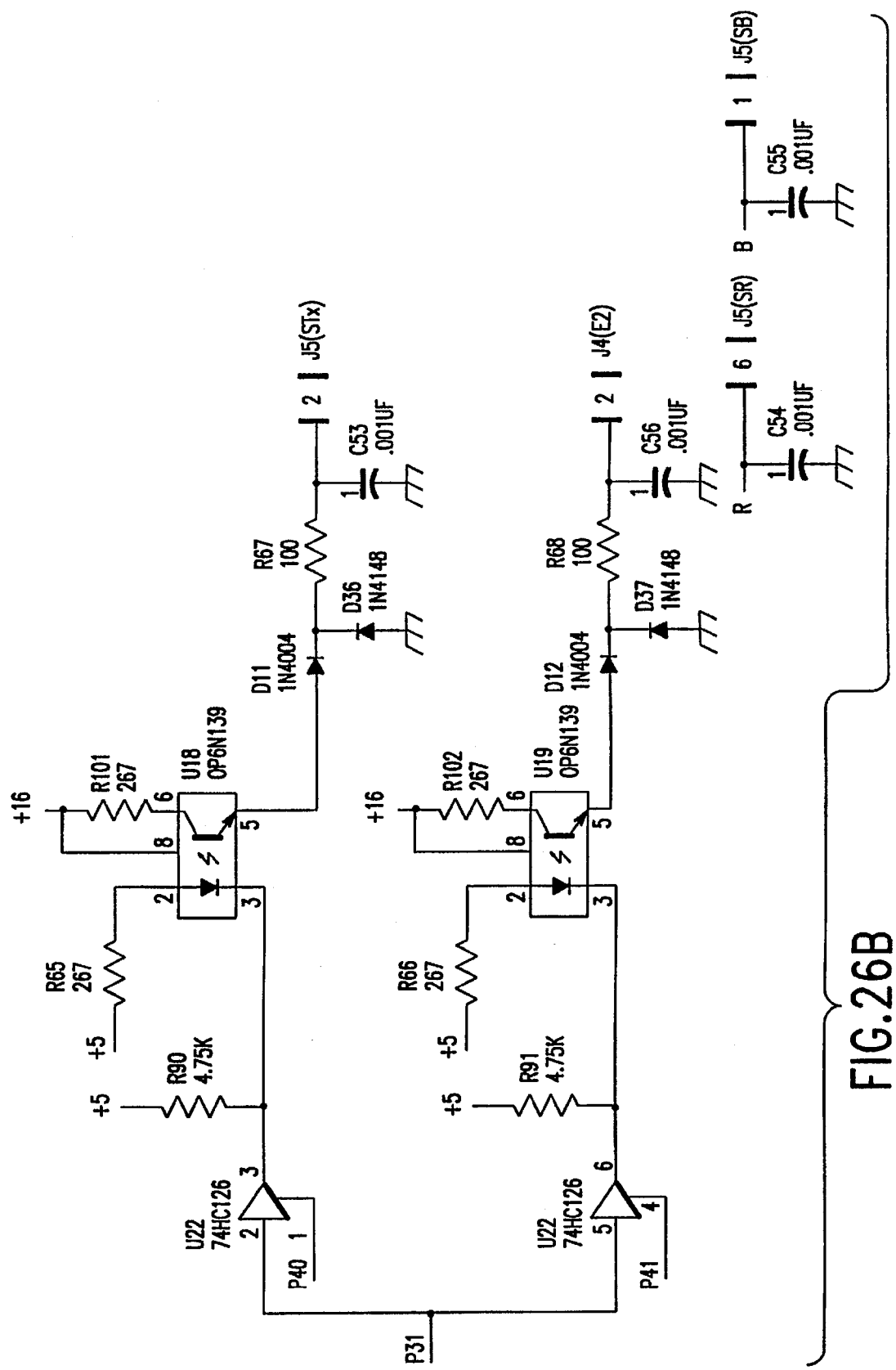
Figure 26C:
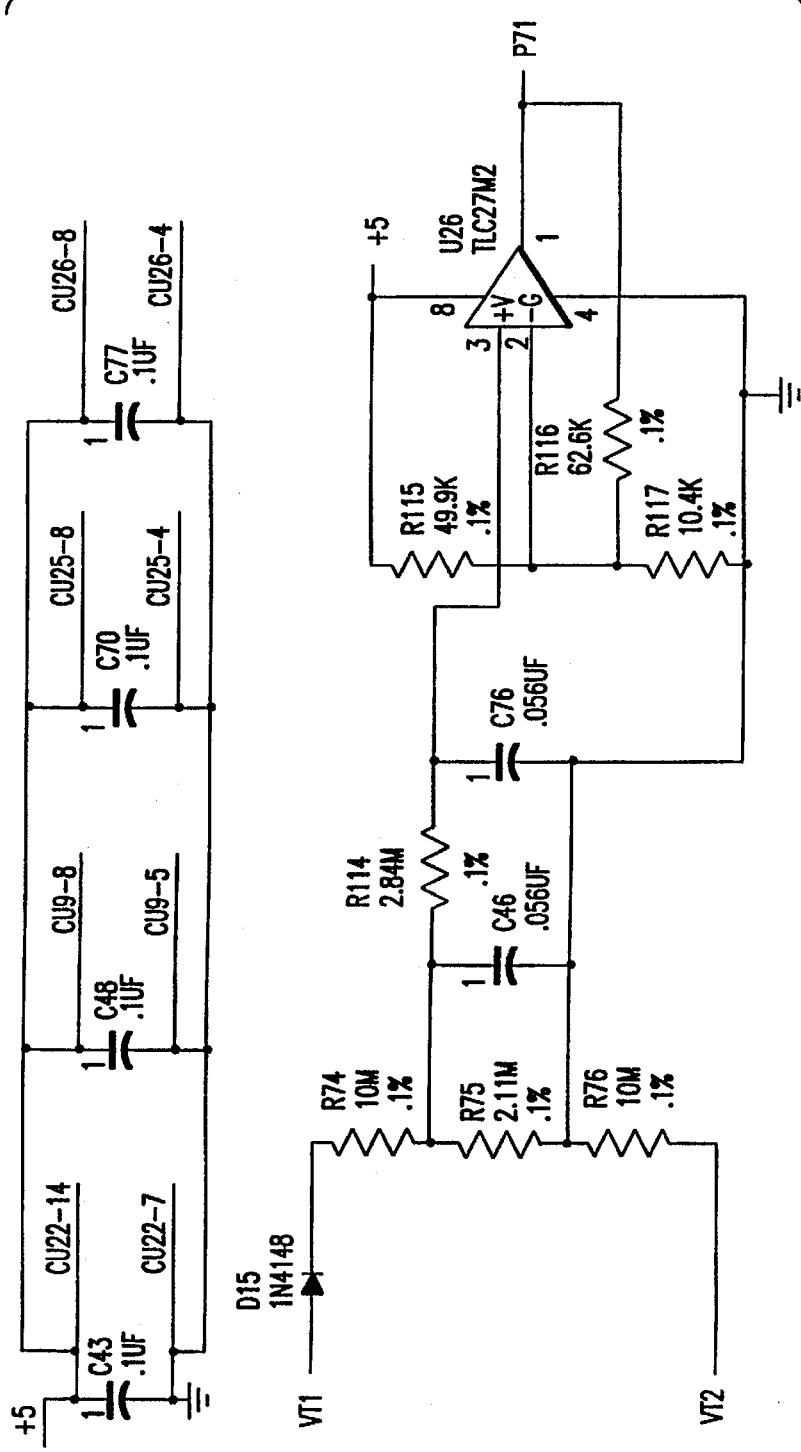
Figure 26D:
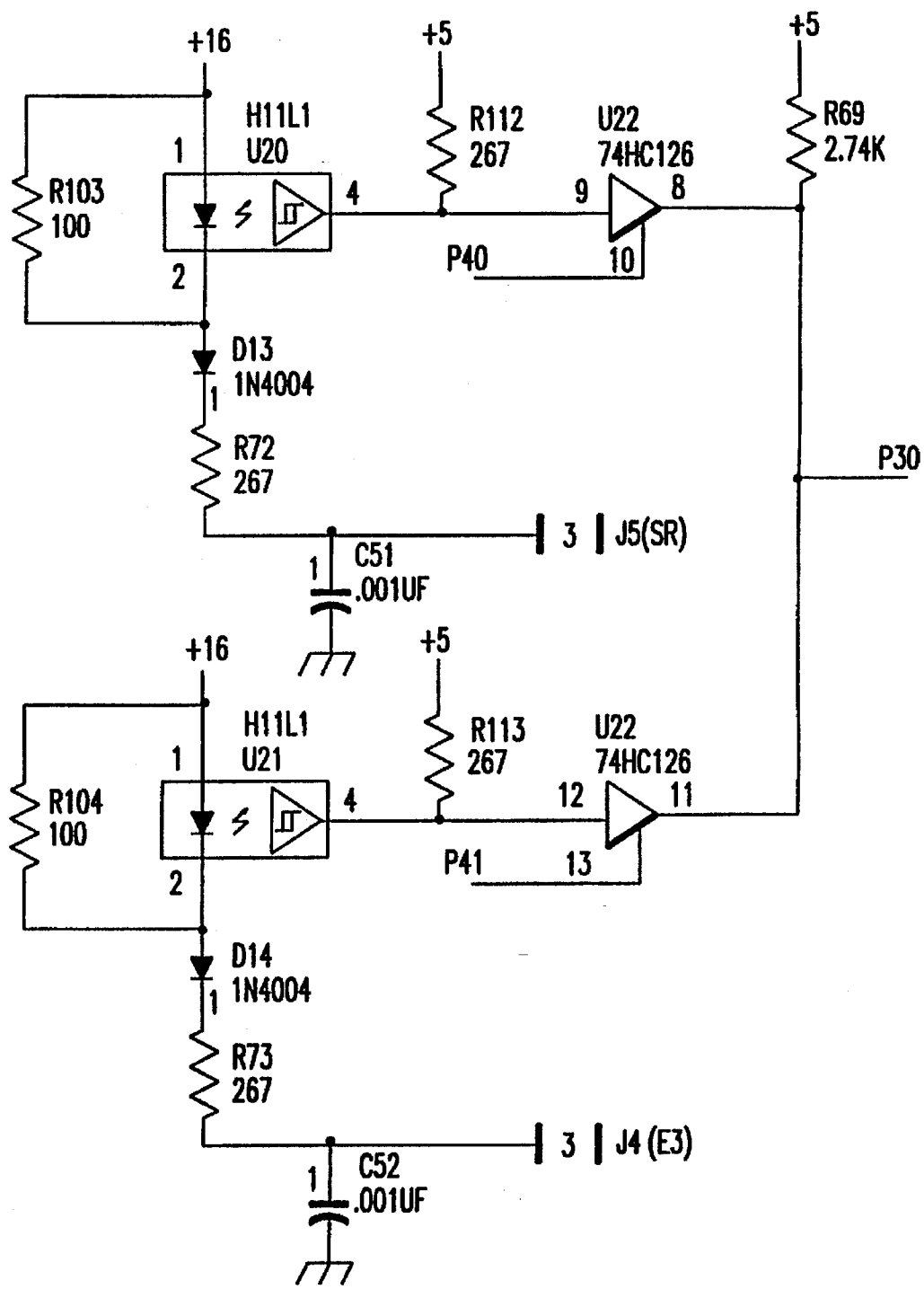
Figure 27A:
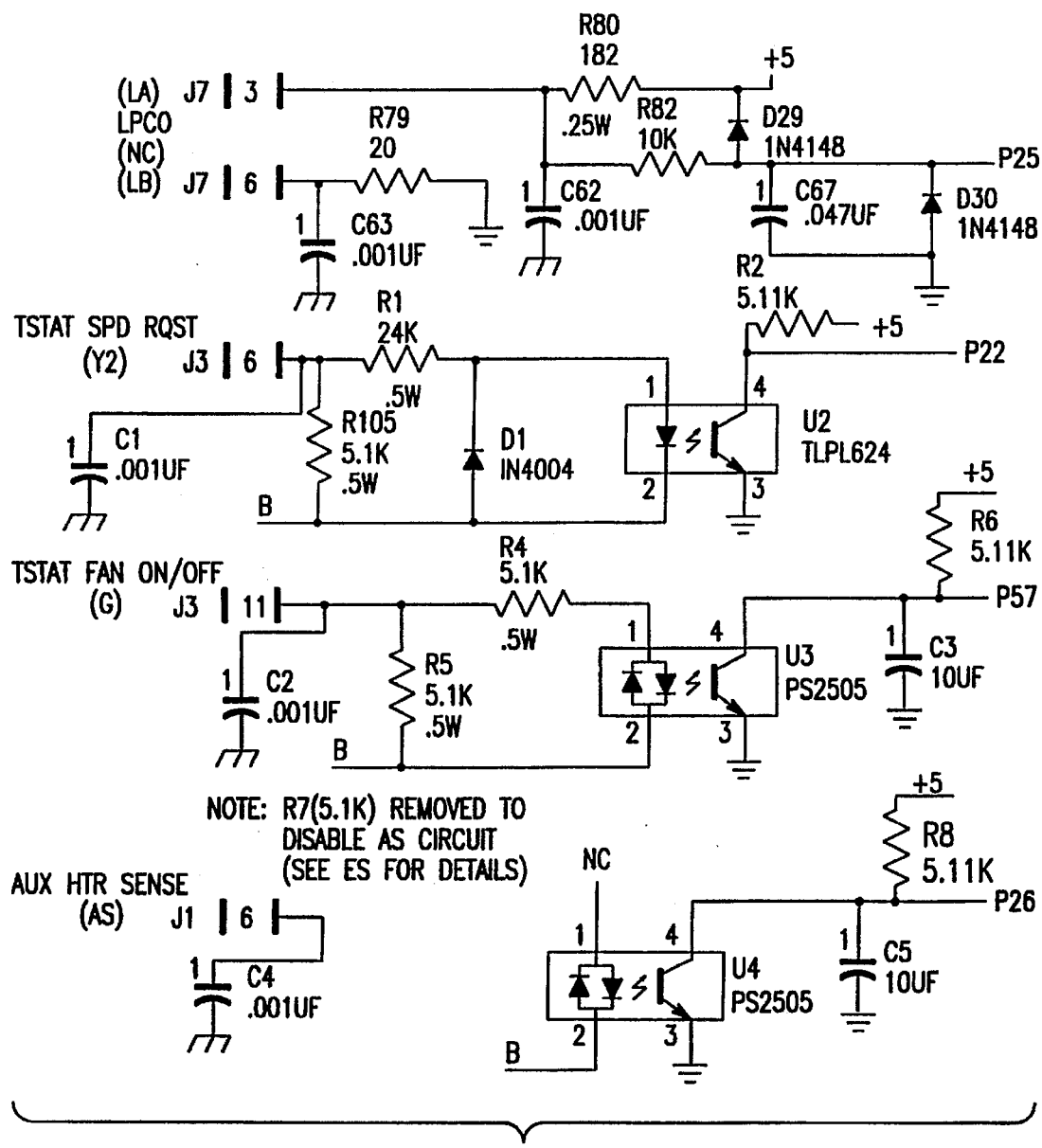
FIGS. 27A–27G show schematic diagrams of the microprocessor and associated subcircuits, according to one preferred embodiment of this invention.
Figure 27B:
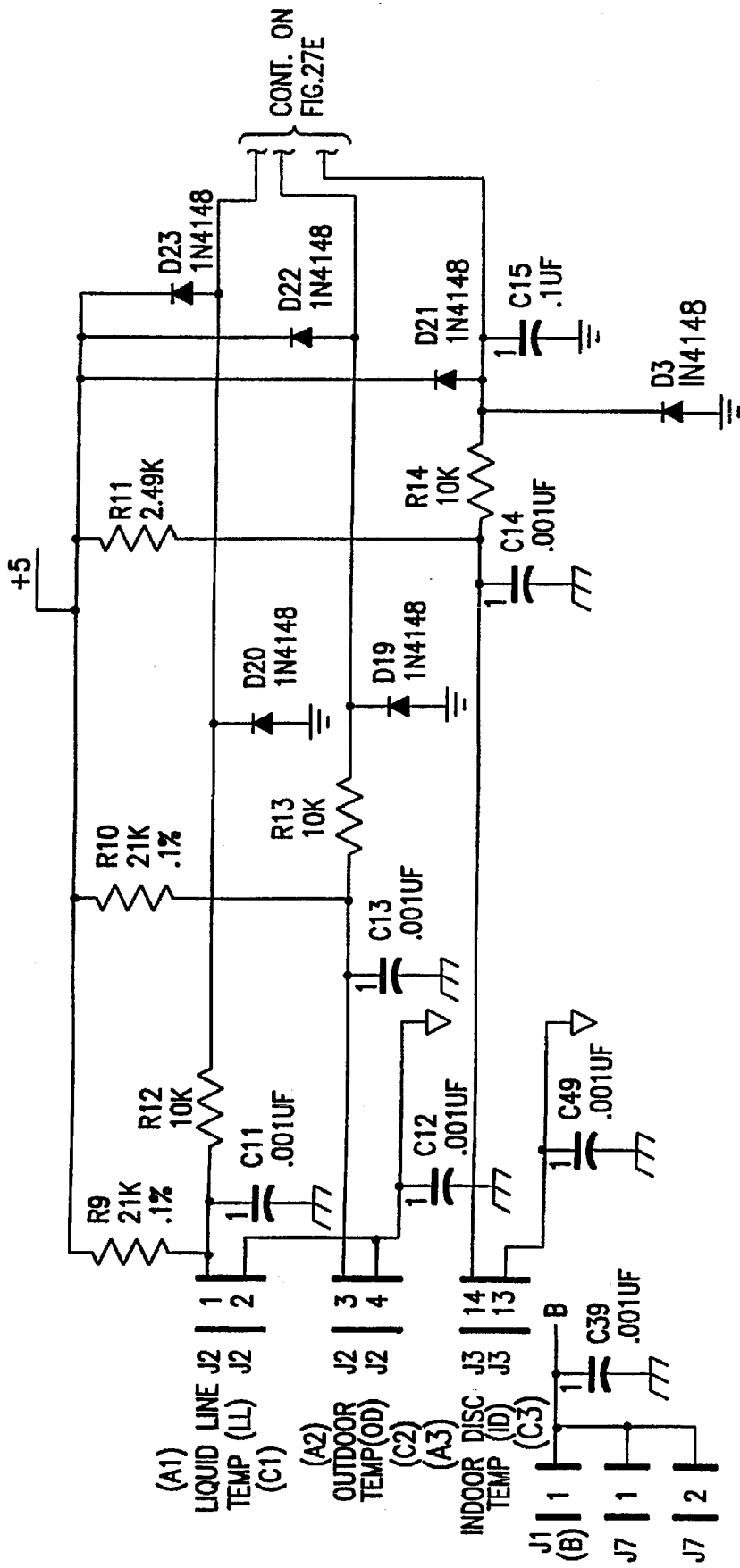
Figure 27C:
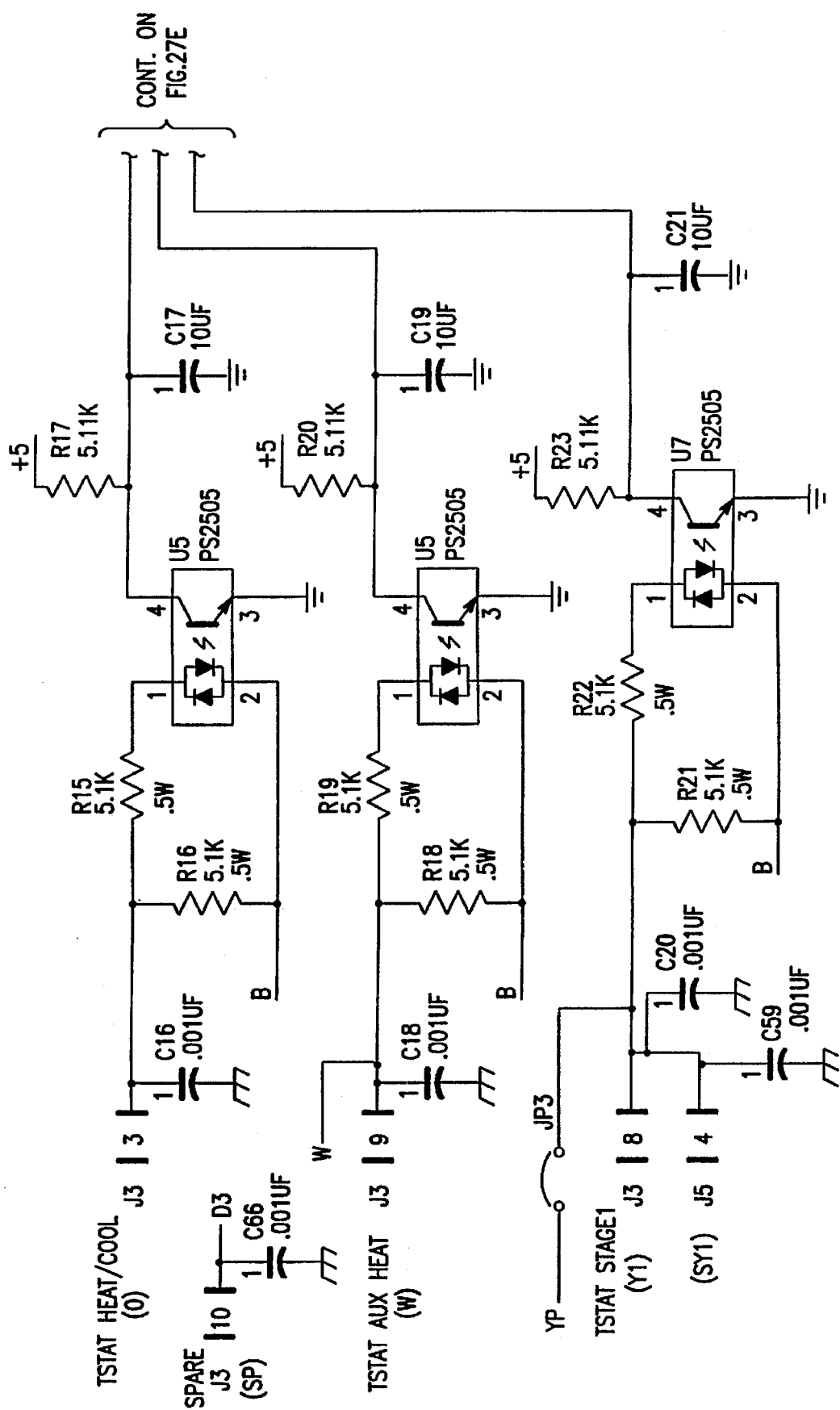
Figure 27D:
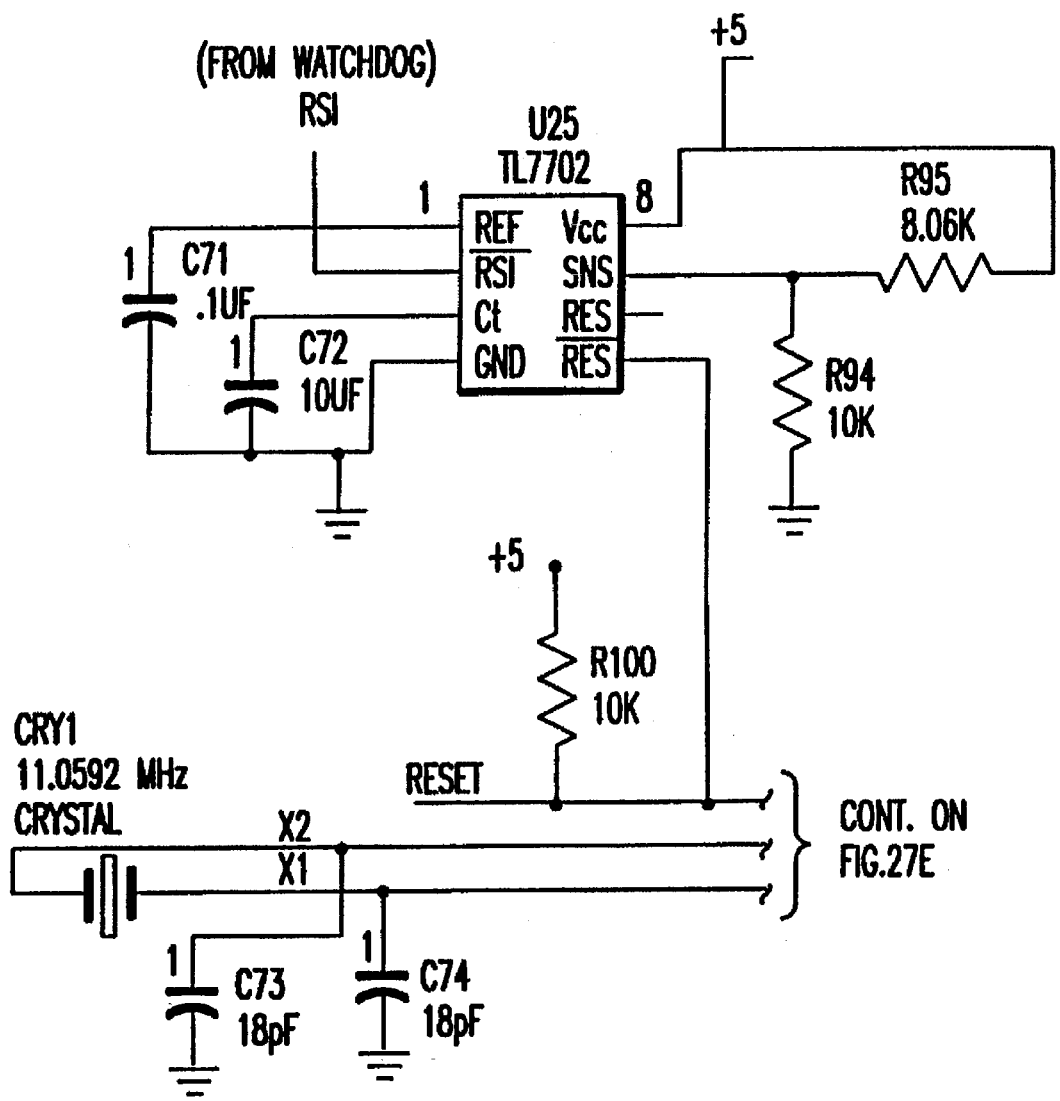
Figure 27E:
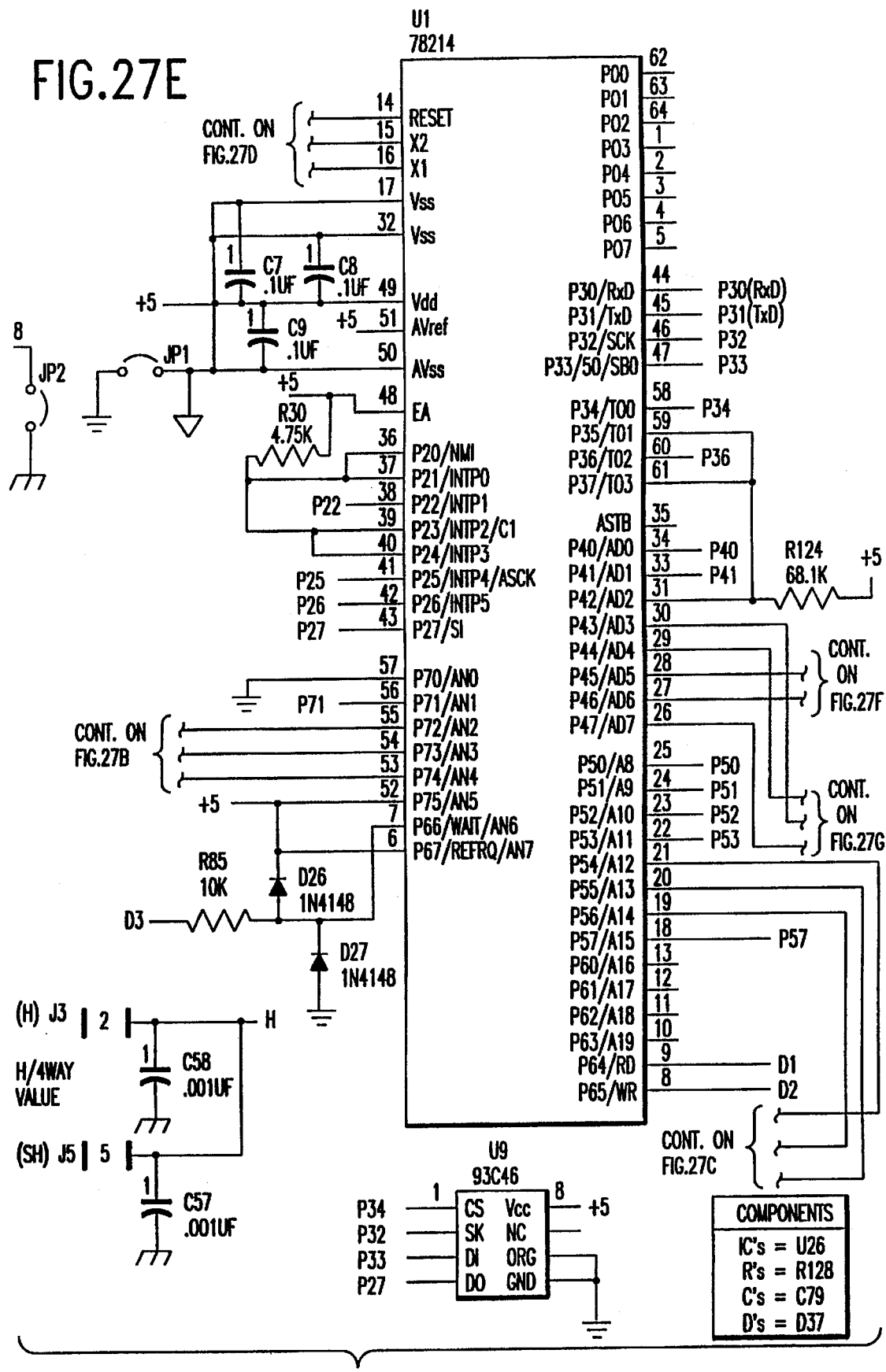
Figure 27F:
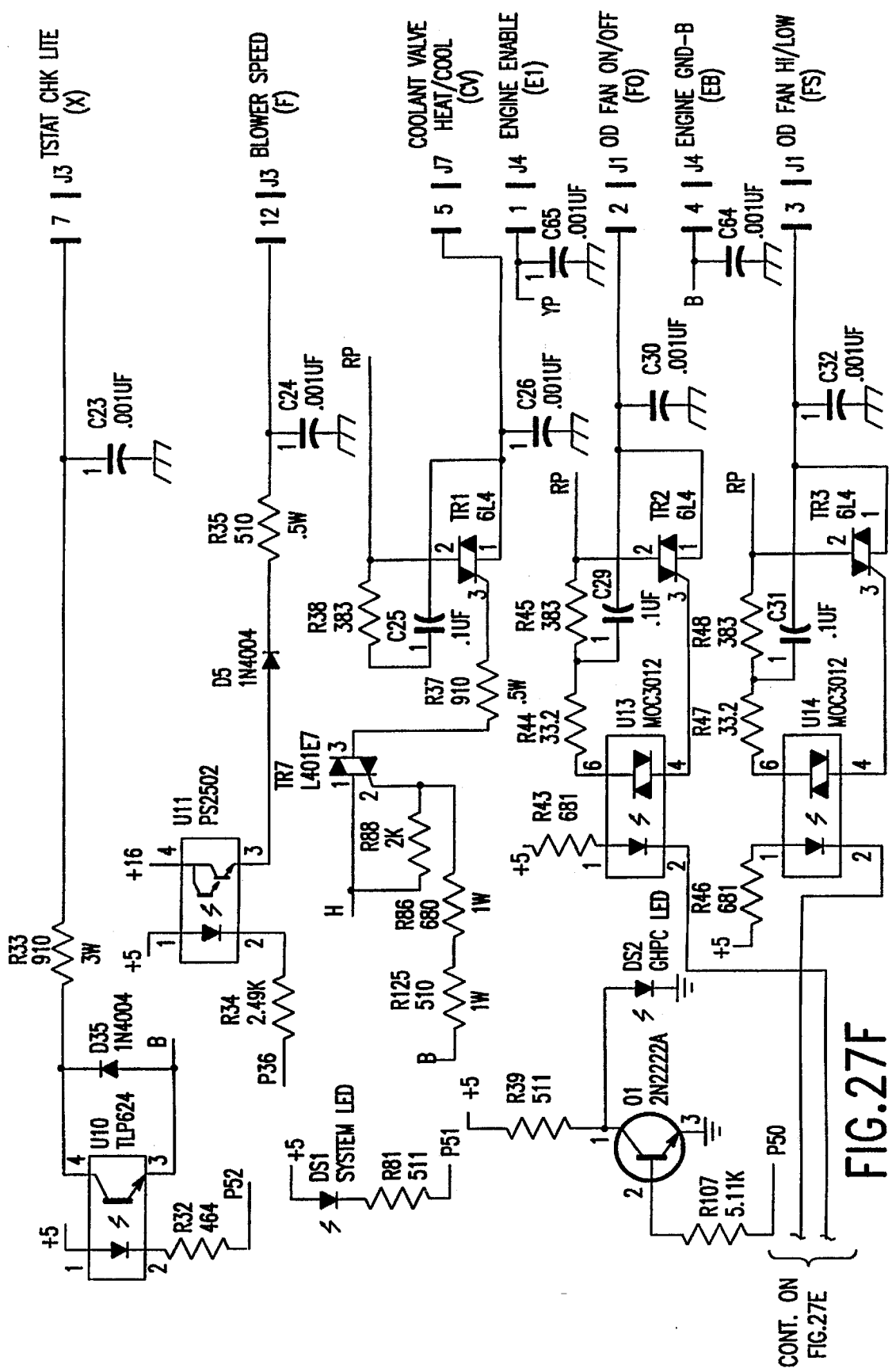
Figure 27G:
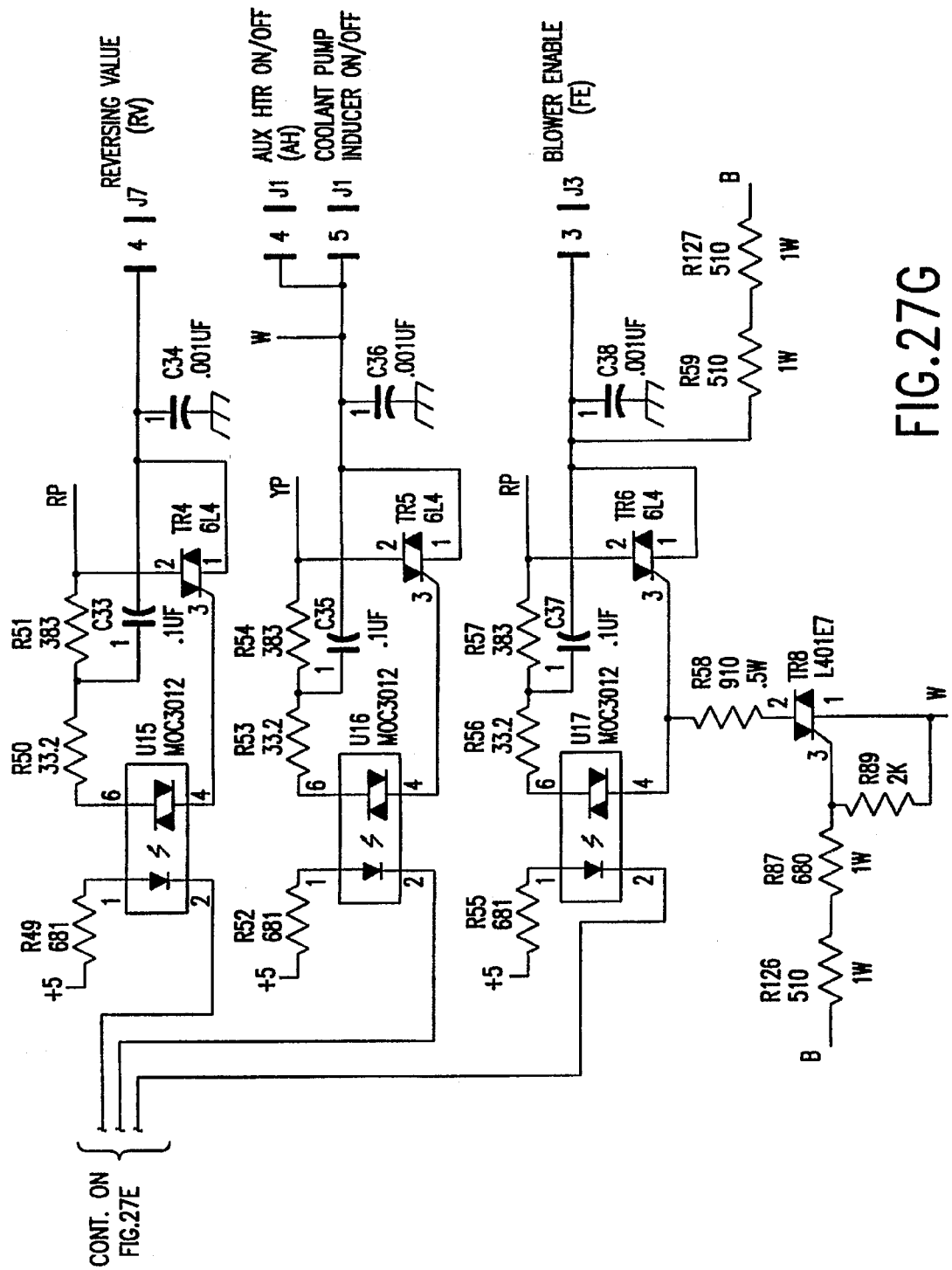

The task scheduler provides the basic mechanism for real-time processing by the controller by managing the various software modules in a timely manner to process the preferred control loops. According to one preferred embodiment of this invention, any processing, control related or not, that may be executed at a predictable time interval of 10 ms or longer is handled by the task scheduler. Scheduled tasks include: most control loop processing, self-test routines, on-board LED display, and NVM access, as shown in FIG. 25.

For irregularly timed or sub-10 ms response for processing, the internal timers and interrupt structure of the microcontroller are used. Examples of irregularly timed requests include: ECS communications, service analyzer data requests and manual mode commands, and the thermostat stage 2 signal. According to one preferred embodiment of this invention, processing that requires sub-10 ms response times include communications with the ECS and service analyzer and generation of the real-time clock (1 ms interval).

According to one preferred embodiment of this invention, control loop processing (and any non-control-related controller function) is performed by software modules or tasks. A module contains the software instructions to perform a specific control (or non-control-related controller) function. Each control output signal is determined by the controller based on the current state, and processing of the corresponding control loop for that output signal.

FIG. 23 illustrates the valid controller operational states (numbered 0–15) and summarizes criteria that should be met to transition from one state to another. Processing of the state machine and transition criteria is performed by the Executive, see FIGS. 24 and 25. Based on the current controller state and the real-time environment, the Executive determines which state should be executed next.

According to one preferred embodiment of this invention, the Executive is a scheduled task that executes every second, processing all control inputs before determining whether to transition to another state. The Executive also schedules appropriate control tasks based on the current state. As a result, the scheduled tasks will execute after the Executive, with the proper sequence of control actuation and timing.

According to one preferred embodiment of this invention, in addition to the scheduler and Executive, other overhead processing is performed that does not contribute directly to control loop processing. Overhead functions include: real-time clock; watchdog timer; fault detection; communications multiplexing; and NVM access.

According to one preferred embodiment of this invention, the real-time clock provides the basic time base used by the scheduler for determining task timer values. The real-time clock is incremented every millisecond based on a timer interrupt inside the microcontroller. The accuracy of all scheduled tasks is dependent on this real-time clock, which is assigned a high priority in the interrupt structure.

According to one preferred embodiment of this invention, a watchdog timer circuit is implemented in the hardware of this invention that will force a reset of the microcontroller if certain conditions are not met. Specifically, the watchdog timer circuit should receive an alternating (logic 0 and 1) input signal at 250 ms intervals to indicate valid operation of the controller software. This signal is generated by a scheduled task. Thus, if the scheduler fails to cause the watchdog timer software to execute after a 250 ms elapsed time, the hardware circuit will force the microcontroller to reset and restart the scheduler. This mechanism detects, for example, the following software failure conditions: when the microcontroller has "hung" and is not executing any instructions; when the controller clock (for example, 11.0592-MHz crystal) has failed (i.e., no software instructions are executing); and when a software module (scheduled task or interrupt service routine) has "looped", and prevented the scheduler from running for 250 ms.

Other heat pump fault conditions (external to the controller) are monitored via a task that executes every second. Detected faults are used by the Executive in determining state transitions, see FIG. 23. Two on-board LEDs are used to display the system fault codes and the controller fault. The thermostat checklight is used to display a service priority code, indicating to the user or homeowner that action or a service call is required.

According to one preferred embodiment of this invention, the controller supports digital data communications with two devices, the Engine Control System (ECS) and the Service Analyzer (SA).

According to one preferred embodiment of this invention, since the microcontroller has only one asynchronous serial Universal Asynchronous Receiver-Transmitter (UART), the controller circuitry multiplexes the two data channels under software control. In another preferred embodiment of this invention the ECS must be an integral part of the heat pump system for the heat pump system to function. The SA is only temporarily connected by service personnel for troubleshooting, fault isolation, and inspection. Therefore, the ECS is considered the higher priority communications channel, and the controller will ensure that it is available every second. The controller will attempt to complete a message exchange with the ECS three times every second. Following a successful exchange, or three unsuccessful attempts, the controller software will cause the multiplex circuitry to connect with the SA data channel and check for an active connection. For the remainder of the 1-sec interval (after ECS communications), if connected, the controller will exchange data and command messages with the SA. At the next 1-sec time interval, the controller will cause the multiplex circuitry to connect to the ECS data channel and repeat the 1-sec process.

According to one preferred embodiment of this invention, the second, synchronous serial communications port on the microcontroller provides an interface with nonvolatile memory (NVM) that contains system operating summary and fault information for review with the service analyzer. The NVM data records are used for system operational summary reporting and chronology of recent faults detected by the controller. Access to the NVM occurs in response to detection of a fault condition by the controller, or in response to a service analyzer data request. NVM is used to augment the microcontroller RAM by retaining certain data during periods of power loss.

Package Overview

With the relatively high ambient air temperature to which the controller of this invention is exposed, it is necessary to maintain component operating temperatures within design temperatures to ensure a relatively long useful life. The controller of this invention uses a specific thermal packaging design that ensures that electronic components are simultaneously thermally-grounded to reject heat, and are electrically-isolated to preclude electrical interference. According to this particular preferred embodiment of this invention, the printed circuit board layout, the controller metal base design, and particular thermally-conductive materials are integrated into the design. FIGS. 26A–26D and 27A–27G show general layouts of the subcircuits associated with the microprocessor according to this invention.

In order to reduce costs associated with production, most electronic components of this invention are rated up to +85° C. Since the components are exposed to a +65° C. ambient, there is only a +20° C. temperature differential safety factor. Thus, the microprocessor of this invention preferably has electronic components which need to be heat sunk and cannot be tied electrically to the heat pump chassis. The output triacs and some of the input and output resistors of the input/output circuits need to dissipate a relatively large amount of heat in order to fulfill the circuit requirements. The output triacs, the +5 VDC voltage regulator, the input/output resistors, the isolation/stepdown transformer and the microprocessor, in one preferred embodiment of this invention, all require attention with respect to heat transfer efficiency.

The controller board is preferably secured to an aluminum baseplate which is connected to the heat pump chassis in order to dissipate heat. The output triacs, which are electrically isolated, are preferably secured to an aluminum bar, which is secured directly to the baseplate for maximum heat dissipation.

The +5 VDC voltage regulator, which should be electrically isolated from the baseplate, is preferably secured to a separate aluminum bar and then secured to the baseplate, but remains isolated by a plastic or other non-heat conductive shoulder washer. The input and output resistors are preferably connected thermally to the baseplate with special thermally conductive foam pads. The isolation/stepdown transformer is secured to the baseplate with a special conductive foam pad and preferably with screws or other suitable fasteners. The board is preferably secured to the baseplate with screws or other fasteners.

FIGS. 28–32 show various tables which summarize data for various heat pump signals and states, according to this invention.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. In a heat pump system having a variable speed compressor, a controller comprising:

variable capacity control means for responding to at least one thermostat output signal and based upon each thermostat output signal computing in real-time performance parameters at variable capacity heating/cooling load conditions of the heat pump system;

defrost control means for calculating an optimum heat pump operating time between successive defrost cycles during a heating mode of a heat pump as a function of an outdoor temperature and variable capacity operating conditions calculated by said variable capacity control means; and said controller communicating with at least one component of the heat pump system for overall control of the heat pump system.

2. A controller according to claim 1 wherein said heat pump is a gas engine heat pump.

3. A controller according to claim 2 wherein an output of the controller controls at least one of an engine on/off output, an engine speed output, an outdoor fan on/off output, an outdoor fan speed output, an auxiliary heat output, a reversing valve output, a coolant valve output, an indoor blower enable output, and an indoor blower speed output, depending upon an output voltage value from said output of the controller.

4. A controller according to claim 2 further comprising a communications interface with which the controller receives and transmits messages via a plurality of signals with an engine control system and a service analyzer which are multiplexed to communicate through a common circuit.

5. A controller according to claim 4 wherein said communication interface commands an engine of the heat pump system to exercise variable capacity control.

6. A controller according to claim 1 wherein said heat pump is an air source type heat pump.

7. A controller according to claim 1 wherein said defrost control means terminates each said defrost cycle when a liquid line temperature rises to a predetermined value.

8. A controller according to claim 7 further comprising computing means for overriding termination of said defrost control means when a predetermined defrost time is exceeded.

9. A controller according to claim 1 wherein said defrost control means terminates each said defrost cycle when an outdoor coil refrigerant temperature rises to a predetermined value.

10. A controller according to claim 9 further comprising computing means for overriding termination of said defrost control means when a predetermined defrost time is exceeded.

11. A controller according to claim 1 further comprising computing means for determining a current operational state of the heat pump system and based upon current sensed values of said current operational state calculating necessary conditions for a successive operational state and emitting at least one of a sensor input value, a control output value, and an internal software variable value from said computing means for transitioning the heat pump system to said successive operational state.

12. A controller according to claim 11 wherein said computing means comprise a plurality of said output signals, and at least one programmed algorithm that determines a controlled sequence of said output signals to achieve a desired operating efficiency for the heat pump system.

13. A controller according to claim 11 wherein said necessary conditions for said successive operational state are calculated as a function of at least one of a sensor input value, a control output value and an internal software variable value.

14. A controller according to claim 1 further comprising manual mode control means for operating the heat pump system at a first control level wherein each said actuator is individually controlled, and for operating the heat pump system at a second control level wherein said manual mode control means generate at least one substitute signal otherwise generated by a thermostat during an operating mode of the heat pump system.

15. A controller according to claim 1 further comprising manual mode control means for verifying correct operation of at least one actuator of the heat pump system as a function of a sequenced input signal while the heat pump system is in a standby mode, and for computing and generating an output signal for controlling each said actuator to achieve efficient operation control of the heat pump system based upon predetermined operating parameters.

16. A controller according to claim 1 wherein said variable capacity control means respond to each said thermostat output signal and a plurality of sensor input signals.

17. A controller according to claim 16 wherein said sensor input signals correspond to at least one of an outdoor air temperature, a liquid line temperature, an outdoor coil refrigerant temperature, an engine coolant temperature and an indoor air discharge temperature.

18. A controller according to claim 1 wherein said temperature corresponds to at least one of a liquid line temperature, an outdoor coil refrigerant temperature and an outdoor air temperature.

19. A controller according to claim 1 wherein said defrost control means integrates sensed compressor speed, said outdoor air temperature and delivered heating capacity of the heat pump system over time to determine said optimum heat pump operating time period between said defrost cycles.

20. A controller according to claim 1 further comprising reset means for resetting the controller when one of a supply voltage to said controller falls below a predetermined minimum supply voltage value and the controller enters at least one incorrect state of operation.

21. A controller according to claim 1 further comprising information means for storing historical data related to the heat pump system and storing diagnostic data in a non-volatile memory of the controller which can be accessed via a service analyzer and is retained during a power-off period.

22. A controller according to claim 1 further comprising: a controller base, and at least one electrical hardware component of the controller simultaneously thermally grounded to said controller base and electrically insulated with respect to said base.

23. A controller according to claim 1 further comprising input voltage monitor control means for transforming an alternating current input voltage signal into a corresponding direct current voltage signal, while keeping said alternating current input voltage signal and said direct current voltage signal electrically isolated, and emitting said direct current voltage signal for use in calculating at least one control algorithm by the controller.

24. A controller according to claim 1 wherein said defrost control means calculates said optimum heat pump operating time as a function of a sensed defrost time range select input.

25. In a heat pump system having a variable speed compressor, a controller comprising variable capacity control means for computing a compressor speed, an indoor blower speed, and an outdoor fan speed of the heat pump system as a function of at least one thermostat output signal in real-time at variable capacity heating/cooling load requirements of the heat pump system.

26. In a heat pump system having a variable speed compressor, a controller comprising defrost control means for calculating an optimum heat pump operating time between successive defrost cycles during a heating mode of the heat pump system as a function of an outdoor air temperature and variable capacity operating conditions, and said controller communicating with at least one component of the heat pump system for overall control of the heat pump system.

27. In a heat pump system having a variable speed compressor, a controller comprising variable capacity control means for computing a compressor speed, an indoor blower speed, and an outdoor fan speed of the heat pump system as a function of at least one thermostat output signal in real-time at variable capacity heating/cooling load requirements of the heat pump system, engine control means for directly controlling and monitoring an engine of the heat pump system, and said engine control means interfaced with said variable capacity control means for exchanging commands from said controller and data from said engine control means.

\* \* \* \* \*